United States Patent
Lee et al.

(10) Patent No.: US 11,580,732 B2
(45) Date of Patent: Feb. 14, 2023

(54) ELECTRONIC DEVICE AND METHOD FOR PROVIDING MULTIPLE SERVICES RESPECTIVELY CORRESPONDING TO MULTIPLE EXTERNAL OBJECTS INCLUDED IN IMAGE

(71) Applicant: Samsung Electronics Co., Ltd, Suwon-si (KR)

(72) Inventors: Dasom Lee, Suwon-si (KR); Jungeun Lee, Suwon-si (KR); Sungoh Kim, Suwon-si (KR); Hyunhee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/684,518

(22) Filed: Nov. 14, 2019

(65) Prior Publication Data
US 2020/0151451 A1   May 14, 2020

(30) Foreign Application Priority Data
Nov. 14, 2018  (KR) ........................ 10-2018-0139741

(51) Int. Cl.
*H04N 5/232*  (2006.01)
*H04N 1/00*   (2006.01)
(Continued)

(52) U.S. Cl.
CPC ......... *G06V 20/20* (2022.01); *H04N 1/00209* (2013.01); *H04N 5/232939* (2018.08); *G06V 30/10* (2022.01); *H04N 2201/0084* (2013.01)

(58) Field of Classification Search
CPC ........... G06K 9/00671; G06K 2209/01; G06K 9/6227; G06K 9/325; G06K 9/2054;
(Continued)

(56) References Cited

U.S. PATENT DOCUMENTS

| 6,341,176 B1 * | 1/2002 | Shirasaki ................. G06K 9/72 382/229 |
| 2004/0168052 A1 * | 8/2004 | Clisham .............. H04L 63/0428 713/153 |

(Continued)

FOREIGN PATENT DOCUMENTS

| CN | 104134229 A | 11/2014 |
| CN | 106412229 A | 2/2017 |

(Continued)

OTHER PUBLICATIONS

KR 101896404 B1, English Translation (Year: 2018).*
(Continued)

*Primary Examiner* — Shahbaz Nazrul

(57) ABSTRACT

An electronic device according to various embodiments includes a communication circuit, a memory, and a processor, and the processor is configured to: receive a first image from a first external electronic device by using the communication circuit; perform image recognition with respect to the first image by using the first image; generate information regarding an external object included in the first image, based on a result of the recognition; based on the information regarding the external object satisfying a first designated condition, transmit at least a portion of the first image to a second external electronic device corresponding to the first designated condition; and, based on the information regarding the external object satisfying a second designated condition, transmit the at least portion of the first image to a third external electronic device corresponding to the second designated condition.

20 Claims, 25 Drawing Sheets

(51) Int. Cl.
*G06V 20/20* (2022.01)
*G06V 30/10* (2022.01)

(58) Field of Classification Search
CPC ........... G06K 9/6253; H04N 5/232939; H04N 1/00209; H04N 2201/0084; H04N 1/00684; H04M 1/72403; H04M 1/72469; H04M 2201/34; H04M 2201/36; H04M 2201/38; G06V 20/20; G06V 30/10; G06V 20/62; G06V 30/1444; G06V 10/945; G06V 30/19113
See application file for complete search history.

(56) References Cited

U.S. PATENT DOCUMENTS

| | | | |
|---|---|---|---|
| 2011/0038512 A1* | 2/2011 | Petrou | G06F 16/532 382/118 |
| 2015/0375117 A1 | 12/2015 | Thompson et al. | |
| 2017/0124618 A1* | 5/2017 | Roeseler | G06Q 30/0623 |
| 2017/0212910 A1* | 7/2017 | Morris | G06F 16/5838 |
| 2018/0276473 A1 | 9/2018 | Kim et al. | |

FOREIGN PATENT DOCUMENTS

| | | |
|---|---|---|
| CN | 107358226 A | 11/2017 |
| JP | 2002-245337 A | 8/2002 |
| JP | 2017-194848 A | 10/2017 |
| KR | 10-2009-0117108 A | 11/2009 |
| KR | 10-2012-0052569 A | 5/2012 |
| KR | 101768521 B1 | 8/2017 |
| KR | 101896404 B1 * | 9/2018 |
| WO | 2011/017653 A1 | 2/2011 |
| WO | 2018091963 A1 | 5/2018 |

OTHER PUBLICATIONS

International Search Report dated Mar. 6, 2020 in connection with International Patent Application No. PCT/KR2019/015575, 3 pages.
Written Opinion of the International Searching Authority dated Mar. 6, 2020 in connection with International Patent Application No. PCT/KR2019/015575, 6 pages.
Supplementary European Search Report in connection with European Patent Application No. EP19884120.7, dated Jul. 6, 2021, 11 pages.
Intellectual Property India, "Examination report under sections 12 &13 of the Patents Act," dated Feb. 24, 2022, in connection with Indian Patent Application No. 202117022427, 6 pages.
China National Intellectual Property Administration, "The Second Office Action," dated May 6, 2022, in connection with Chinese Patent Application No. 201980075288.X, 22 pages.
The First Office Action dated Nov. 19, 2021, in connection with Chinese Application No. 201980075288.X, 27 pages.
Office Action dated Sep. 27, 2022 in connection with Chinese Patent Application No. 201980075288.X, 23 pages.
Communication pursuant to Article 94(3) EPC dated Jul. 15, 2022 in connection with European Patent Application No. 19 884 120.7, 7 pages.

* cited by examiner

ELECTRONIC DEVICE AND METHOD FOR PROVIDING MULTIPLE SERVICES RESPECTIVELY CORRESPONDING TO MULTIPLE EXTERNAL OBJECTS INCLUDED IN IMAGE

CROSS-REFERENCE TO RELATED APPLICATION

This application is based on and claims priority under 35 U.S.C. § 119 to Korean Patent Application No. 10-2018-0139741 filed on Nov. 14, 2018 in the Korean Intellectual Property Office, the disclosure of which is herein incorporated by reference in its entirety.

BACKGROUND

1. Field

Various embodiments relate to an electronic device which provides a service based on an image, and a method thereof.

2. Description of Related Art

With the recent enhancement of digital technology, various types of electronic devices such as mobile communication terminals, personal digital assistants (PDAs), electronic schedulers, smartphones, tablet personal computers (PCs), wearable devices, or the like are widely used. To support and increase functions of such electronic devices, hardware parts and/or software parts of electronic devices are continuously developing.

For example, an electronic device may obtain an image (for example, a raw image) from a camera embedded therein, adjust the image, and provide the adjusted image to a user. The electronic device may adjust the image by using an image signal processor (ISP). The image signal processor may process an image by using an image quality enhancement algorithm, and accordingly, may provide an image with enhanced image quality.

The above information is presented as background information only to assist with an understanding of the disclosure. No determination has been made, and no assertion is made, as to whether any of the above might be applicable as prior art with regard to the disclosure.

SUMMARY

An electronic device may provide at least one of a plurality of services to a user, based on an external object included in an image. To provide at least one of the plurality of services, the electronic device may require the user to select at least one of the plurality of services. After moving the electronic device to have an external object included in an image, the user should additionally select what service the user wants to receive, based on the external object.

The technical objects to be achieved by the disclosure are not limited to those mentioned above, and other technical objects that are not mentioned above may be clearly understood to those skilled in the art based on the description provided below.

An electronic device according to various embodiments may include: a communication circuit; a memory; and a processor, wherein the processor is configured to: receive a first image from a first external electronic device by using the communication circuit; perform image recognition with respect to the first image by using the first image; generate information regarding an external object included in the first image, based on a result of the recognition; based on the information regarding the external object satisfying a first designated condition, transmit at least a portion of the first image to a second external electronic device corresponding to the first designated condition in order for the second external electronic device to generate first recognition information corresponding to the at least portion of the first image; and, based on the information regarding the external object satisfying a second designated condition, transmit the at least portion of the first image to a third external electronic device corresponding to the second designated condition in order for the third external electronic device to generate second recognition information corresponding to the at least portion of the first image.

An electronic device according to various embodiments includes: an image sensor; a display; a communication circuit; a memory configured to store a plurality of instructions; and at least one processor operably coupled to the image sensor, the display, the communication circuit, and the memory, wherein, when being executed, the plurality of instructions cause the at least one processor to: obtain an image from the image sensor; in response to the image being obtained, display the obtained image on the display; based at least on a first external electronic device connected by using the communication circuit, identify multiple portions corresponding to a plurality of designated types within the image, respectively; in response to the multiple portions being identified, display a plurality of visual elements overlaid on the multiple portions within the displayed image, the plurality of visual elements having shapes distinct from one another according types corresponding to the portions, which are overlaid with the plurality of visual elements, from among the plurality of designated types; and, based on at least some of a plurality of second external electronic devices which are distinct from the first external electronic device and correspond to the plurality of designated types, respectively, change display of the plurality of visual elements.

An electronic device according to various embodiments includes: an image sensor; a display; a communication circuit; a memory configured to store a plurality of instructions; and at least one processor operably coupled to the image sensor, the display, the communication circuit, and the memory, wherein, when being executed, the plurality of instructions cause the at least one processor to: obtain an image from the image sensor; in response to the image being obtained, display the obtained image on the display; while displaying the image on the display, identify a plurality of subjects included in the image; in response to the plurality of subjects being identified, output a plurality of first visual elements floated on multiple portions of the displayed image, the multiple portions corresponding to the plurality of identified subjects, respectively; while outputting the plurality of visual elements, identify information related to the plurality of subjects from a plurality of external electronic devices corresponding to the plurality of subjects, respectively; and in response to the information related to the plurality of subjects being identified, output a plurality of second visual elements which are floated on the multiple portions and are based on identifiers of the plurality of external electronic devices and at least part of the identified information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
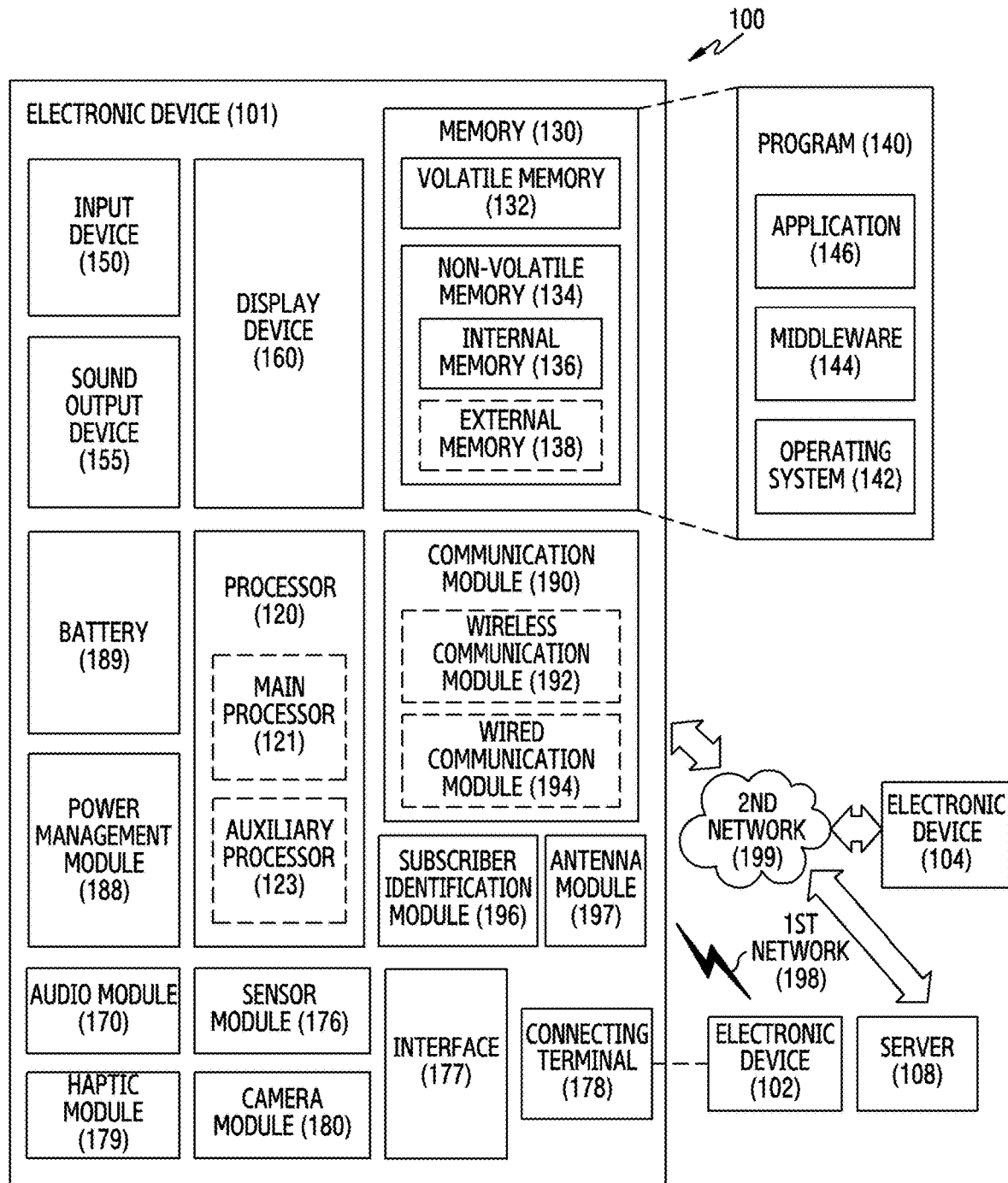
FIG. 1 illustrates a block diagram of an electronic device in a network environment according to various embodiments.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. It should be appreciated that various embodiments and the terms used therein are not intended to limit the technological features set forth herein to particular embodiments, and include various modifications, equivalents, and/or alternatives of embodiments of the disclosure. With regard to the description of the drawings, similar reference numerals may be used to refer to similar elements.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like may include all possible combinations of the items enumerated together. For example, "A or B," "at least one of A and B," or "at least one of A or B" may refer to all of the case (1) where at least one A is included, the case (2) where at least one B is included, or the case (3) where both of at least one A and at least one B are included.

As used herein, such terms as "1st" and "2nd," or "first" and "second" may be used to simply distinguish a corresponding component from another, and does not limit the components in other aspect (e.g., importance or order). For example, "a first user device" and "a second user device" indicate different user devices regardless of the order or priority. For example, without departing from the scope of the disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element) between the element and another element.

According to the situation, the term "configured to (or set to)" used in the disclosure may be interchangeably used with the terms "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), or the like, for performing corresponding operations by executing one or more software programs stored in a memory device.

Terms used in the disclosure are used to describe specified embodiments and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistant (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable devices may include at least one of accessories (for example, watches, rings, bracelets, ankle bracelets, necklaces, glasses, contact lenses, head-mounted-devices (HMDs), etc.), fabric- or clothing-mounted devices (for example, electronic apparels), body-mounted devices (for example, skin pads, tattoos, etc.), or bio-implantable circuits.

According to some embodiments, the electronic devices may be home appliances. The home appliances include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™, or Google TV™), game consoles (for example, Xbox™ and PlayStation™), electronic dictionaries, electronic keys, camcorders, or electronic picture frames.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or internet of things (for example, light bulbs, various sensors, electricity or gas meters, sprinkler devices, fire alarms, thermostats, street lamps, toasters, exercise equipment, hot water tanks, heaters, boilers, or the like).

According to an embodiment, the electronic devices may include at least one of furniture, a part of buildings/structures, electronic boards, electronic signature receiving devices, projectors, or various measuring instruments (for example, water meters, electricity meters, gas meters, or wave meters). In various embodiments, the electronic devices may be one or a combination of two or more devices of the above-mentioned devices. According to a certain embodiment, the electronic device may be a flexible electronic device or a foldable electronic device. Also, the electronic devices according to various embodiments of the disclosure are not limited to the above-mentioned devices, and may include new electronic devices according to technology development.

In the disclosure, the term "user" may refer to a person who uses the electronic device or a device that uses the electronic device (for example, an artificial intelligence electronic device).

Hereinafter, various embodiments will be described in detail with reference to the accompanying drawings. However, dimensions of elements in the drawings may be exaggerated or reduced for convenience of explanation. For example, sizes and thicknesses of respective elements shown in the drawings are arbitrarily illustrated for convenience of explanation, and thus the disclosure should not be limited to the illustrations of the drawings.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
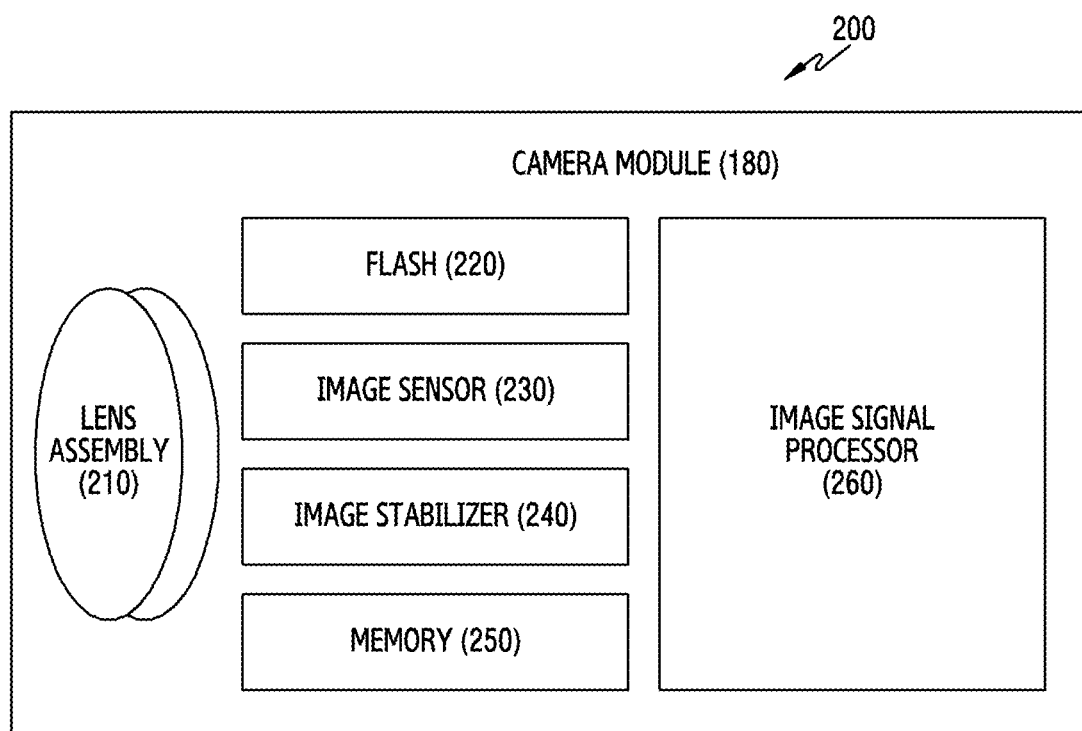
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
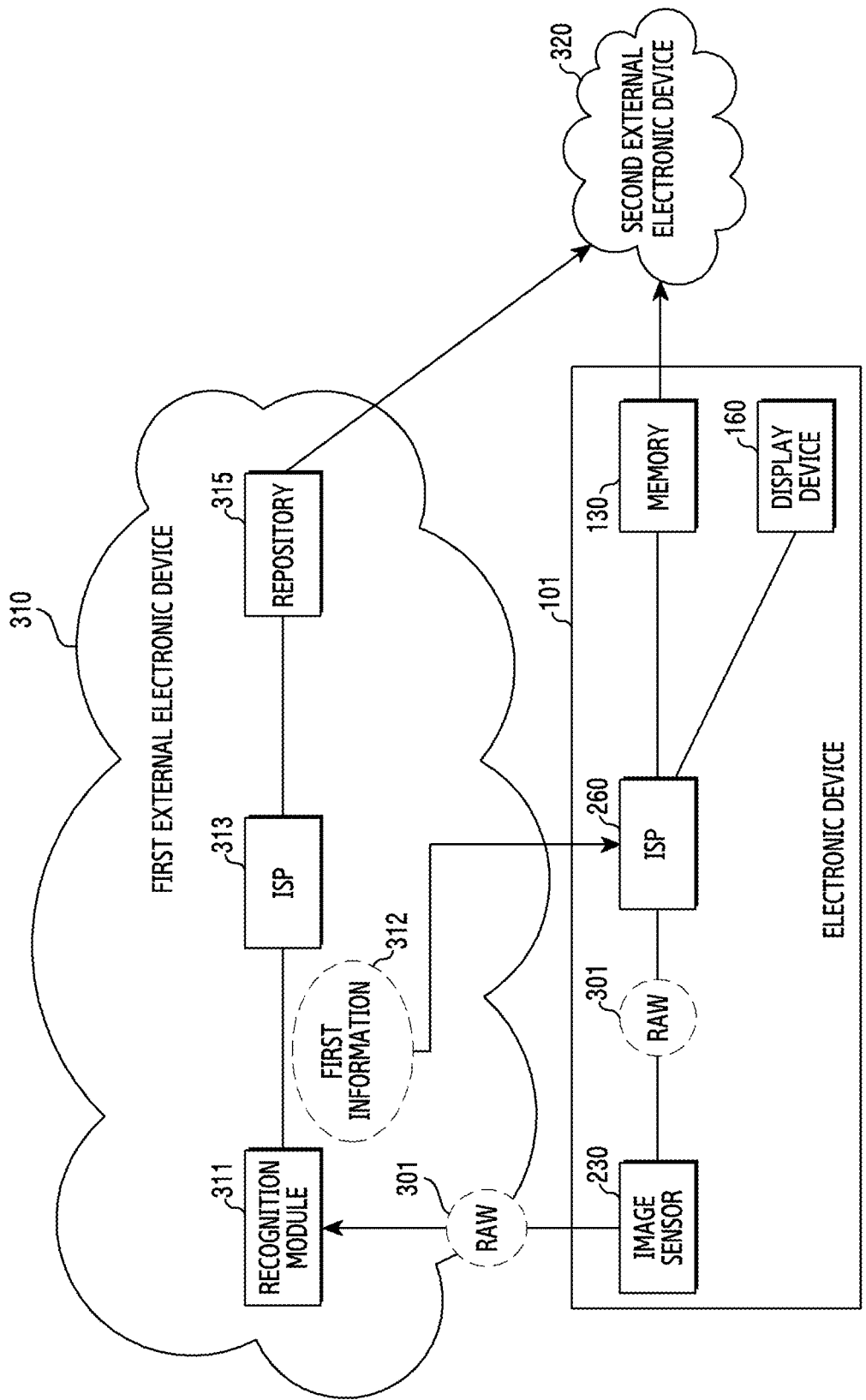
FIG. 3 illustrates a concept view to explain a method for adjusting an image of an electronic device and an external electronic device according to various embodiments.

FIG. 3 illustrates a concept view to explain a method for adjusting an image of an electronic device and an external electronic device according to various embodiments.

Referring to FIG. 3, the electronic device 101 may include an image sensor 230, an image signal processor (ISP) 260, and a memory 130. A first external electronic device 310 may include a recognition module 311, an ISP 313, and a repository 315. The recognition module 311 may be a logic module and may be implemented as a processor of the first external electronic device 310. The ISP 313 may also be implemented as a processor of the first external electronic device 310, and for example, the processor of the first external electronic device 310 may perform both recognition and image processing. The electronic device 10 may include a communication module (for example, the communication module 190 of FIG. 1) to exchange data with the first external electronic device 310, although it is not illustrated. The first external electronic device 310 may include a communication module to exchange data with the electronic device 101.

The image sensor 230 (for example, the camera module 180 of FIGS. 1 and 2) may obtain an image regarding an external object, and may generate a raw image 301 (a long sight image) corresponding to the image. The image sensor 230 may transmit the raw image 301 to the ISP 260. In various embodiments, the image sensor 230 may generate a small raw image which is generated based on the raw image 301 and has a size smaller than that of the raw image 301, and may transmit the small raw image to the first external electronic device 310 through the communication module. In another embodiment, a processor of the electronic device 101 rather than the image sensor 230 may generate the small raw image, and may transmit the generated small raw image to the first external electronic device 310 through the communication module. The image sensor 230 may transmit the raw image 301 in a compressed state to the ISP 260 or the first external electronic device 310. The image sensor 230 may compress to process a part of the raw image 301, and may store the compressed image in an internal memory of the image sensor 230.

The recognition module 311 of the first external electronic device 310 may obtain the raw image 301 or the small raw image through the communication module, and may segment at least one image area from the raw image. The recognition module 311 may recognize each of at least one image area divided as a result of segmenting. First information 312 including information related to the plurality of image areas generated from the recognition module 311, for example, at least one of coordinates information of the image areas or a result of recognizing, may be generated. The first information 312 may be transmitted to the electronic device 101. The ISP 260 may adjust the raw image 301 by using the first information 312, and accordingly, may generate an adjusted image. The adjusted image may have, for example, a YUV format. The adjusted image may be stored in the memory 130. Alternatively, the adjusted image may be compressed, for example, according to a JPEG method, and the compressed image may be stored in the memory 130.

In various embodiments of the disclosure, the raw image 301 provided from the image sensor 230 may be transmitted to the first external electronic device 310. Since the raw image 301 has a large capacity in comparison to the small raw image, the small raw image may be transmitted to the first external electronic device 310 first, and then, the raw image 301 may be transmitted to the first external electronic device 310. For example, the raw image 301 may be transmitted to the first external electronic device 310 while the ISP 260 is adjusting the raw image 301. The raw image 301 may be uploaded onto the first external electronic device 310 as originally generated by the image sensor 230, or a pre-processed image which has undergone lens distortion compensation or noise removal may be uploaded.

The above-described pre-processing may be performed at the first external electronic device 310. The first external electronic device 310 may perform Demosaic processing or image format change, or pre-processing to increase an image recognition rate. The ISP 313 of the first external electronic device 310 may adjust the received raw image 301. The first external electronic device 310 may adjust the raw image 301 by using existing generated first information 312, or may adjust the raw image 301 by using extended first information. The raw image 301 may have a high resolution in comparison to the small raw image, and accordingly, the ISP 313 of the first external electronic device 310 may obtain extended first information which is more specific from the high-resolution image. The ISP 313 may generate the extended first information by using the existing generated first information 312 and the raw image 301. The ISP 313 may adjust the raw image 301 by using the extended first information, thereby obtaining a high resolution (high quality) image. The high resolution image may be stored in the repository 315 of the first external electronic device 310, and may be downloaded to the electronic device 101.

According to various embodiments, the electronic device 101 may display additional information (for example, the first information 312) on the raw image 301 captured by using the image sensor 230. The electronic device 101 may display the additional information on the raw image 301, based on at least one of the first external electronic device 310 or one or more second external electronic devices 320. In an embodiment, the first external electronic device 310 may correspond to a cloud camera server corresponding to the camera module (for example, the camera module 180 of FIGS. 1 and 2) of the electronic device 101.

As described above, the first external electronic device 310 may process the raw image 301 of the electronic device 101, or may analyze the raw image 301. The electronic device 101 may obtain, from the first external electronic device 310, a result of analyzing the raw image 301 by the first external electronic device 310 (for example, the first information 312), and then, may output an image resulting from processing of the raw image 301 based on the obtained result within a display device 160.

The first external electronic device 310 may identify information included in the raw image 301 based on the analyzed raw image 301. The information identified by the first external electronic device 310 may indicate meaningful information to the user of the electronic device 101, for example, may indicate what a subject included in the raw image 301 is, what service can be provided to the user in relation to the subject. In an embodiment, the first external electronic device 310 may correspond to a vision cloud server which identifies information in an image provided by the camera module of the electronic device 101.

At least one of the electronic device 101 or the first external electronic device 310 may be connected with the one or more second external electronic devices 320. The second external electronic device 320 may be a server that is operated by a service provider providing a service based on the first information 312 obtained from the raw image 301. In an embodiment, the second external electronic device 320 may correspond to a third party cloud server that provides additional information based on information (for example, the first information 312) resulting from analysis of the raw image 301 from the first external electronic device 310.

In various embodiments, the electronic device 101 may transmit at least part of raw data (for example, the raw image 301) obtained by using the image sensor 230 to the first external electronic device 310. In an embodiment, the first external electronic device 310 may transmit information identifying the raw image 301 to the second external electronic device 320. While transmitting at least part of the raw data to the first external electronic device 310, the electronic device 101 may output an image corresponding to the raw data to the user through the display device 160. For example, the electronic device 101 may output image data corresponding to the raw data on a display of the display device 160.

When the first information 312 is received from the first external electronic device 310, the electronic device 101 may adjust the raw data based on the first information 312 or may output information related to an object (for example, a subject or an external object) included in the raw data based on the first information 312. For example, the electronic device 101 may output one or more visual elements overlaid on the object included in the image data, on the image data displayed on the display, based on the first information 312.

When the user performs an operation of capturing an image through the electronic device 101, the electronic device 101 may store raw data obtained from the image sensor 230 in the memory 130. The operation of capturing the image may include, for example, an operation of pressing a designated button (for example, a shutter button or a volume control button) of the electronic device 101, or an operation of touching a designated visual element (for example, an icon having a designated shape such as a shutter-like shape) displayed on the display.

When the user performs an operation of searching an image through the electronic device 101, the electronic device 101 may search based on an object included in the image by transmitting raw data related to the operation to the first external electronic device 310. The operation of searching the image may include, for example, an operation of pressing a designated button of the electronic device 101, or an operation of touching a designated visual element (for example, an icon including an image related to the search function) displayed on the display. The user may search based on an image captured through the image sensor 230 in real time, as well as an image stored in the memory 130 and captured in the past.

The first external electronic device 310 may analyze raw data (for example, the raw image 301) received from the electronic device 101, and generate the first information 312. The first external electronic device 310 analyzing image data may include at least one of an operation of classifying scenes of the raw data, an operation of analyzing an object included in the raw data, or an operation of segmenting at least part of the raw data. The first information 312 may include information related to an object (for example, a subject, an external object, or a string or an image displayed on the subject) included in the raw data. In an embodiment, the first information 312 may correspond to recipe information related to the raw data. The ISP 313 of the first external electronic device 310 may process the raw data based on the first information 312.

Figure 4:
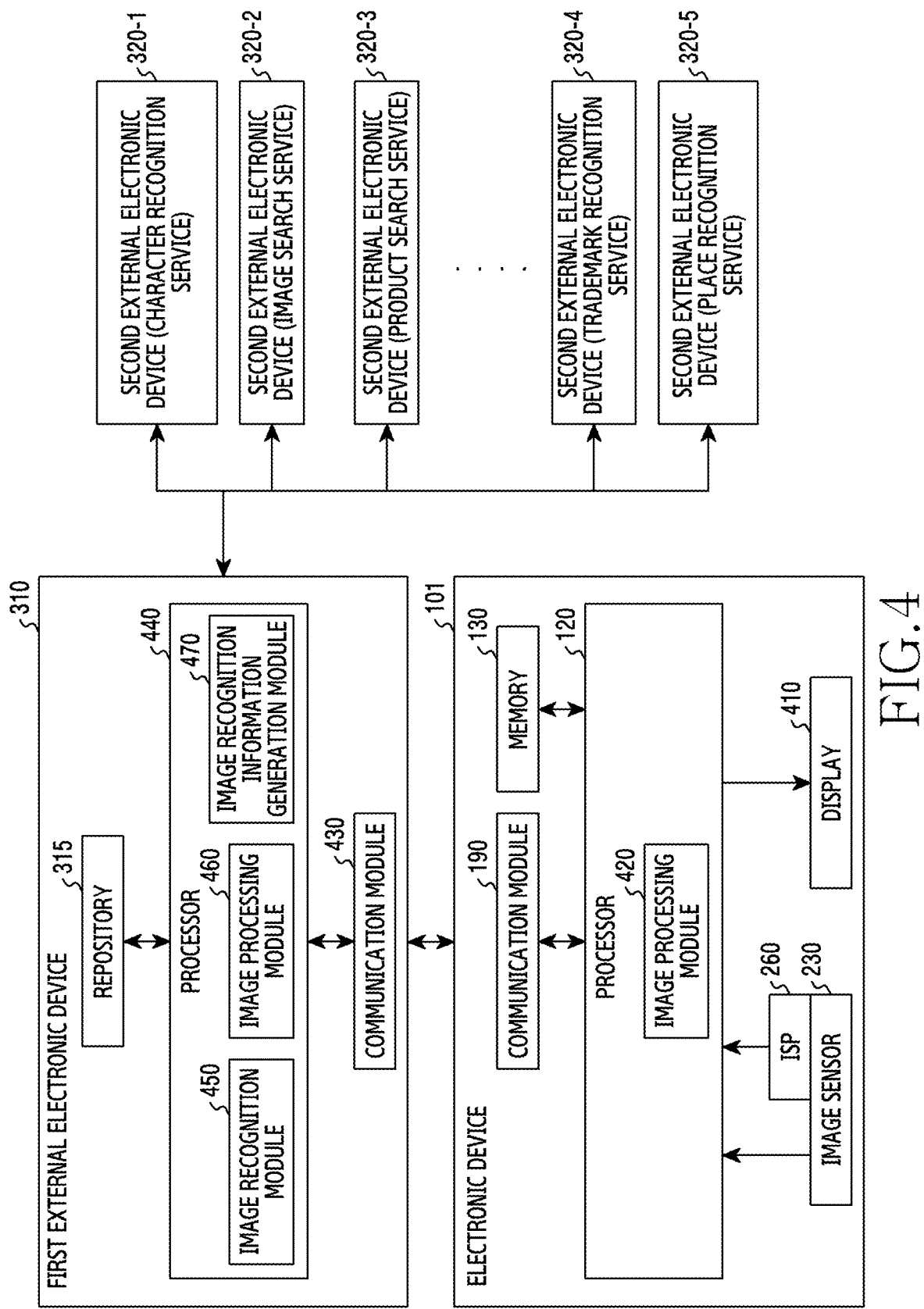
FIG. 4 illustrates a block diagram of an electronic device, a first external electronic device, and second external electronic devices according to various embodiments.

FIG. 4 illustrates a block diagram of an electronic device 101, a first external electronic device 310, and second external electronic devices according to various embodiments. The electronic device 101 of FIG. 4 may correspond to the electronic device 101 of FIGS. 1, 2, and 3. The first external electronic device 310 of FIG. 4 may correspond to the first external electronic device 310 of FIG. 3. The second external electronic devices of FIG. 4 may be related to the second external electronic device 320 of FIG. 3.

The electronic device 101 may be a device that is personalized for a user of the electronic device 101. The electronic device 101 may correspond to at least one of a smartphone, a smart pad, a tablet PC, a personal digital assistant (PDA), a laptop PC, or a desktop PC. The electronic device 101 may correspond to user equipment (UE). The electronic device 101 may include at least one of an image sensor 230, an ISP 260, a display 410, a processor 120, a memory 130, and a communication module 190. The image sensor 230, the ISP 260, the display 410, the processor 120, the memory 130, and the communication module 190 may be electrically connected with one another through a communication bus (not shown).

The image sensor 230 and the ISP 260 may correspond to the image sensor 230 and the ISP 260 of FIGS. 2 and 3, respectively. The image sensor 230 may include a plurality of sensors (for example, photo diodes (PDs)) to output electric signals corresponding to light incoming from the outside, based on the photoelectric effect. The plurality of sensors may be arranged in the image sensor 230 based on a two-dimensional arrangement. The image sensor 230 may align a plurality of electric signals outputted from the plurality of sensors, respectively, according to the two-dimensional arrangement, and may output the signals. As data outputted from the image sensor 230, data including a plurality of electric signals aligned according to the two-dimensional arrangement is referred to as raw data. For example, the raw data may correspond to the raw image 301 of FIG. 3.

The ISP 260 may include a circuit for processing raw data, for example, at least one of an integrated circuit (IC), an arithmetic logic unit (ALU), a field programmable gate array (FPGA), and a large scale integration (LSI). The ISP 260 may perform pre-processing to correct distortion included in raw data. The pre-processing may be performed in a Bayer pattern level, and may include an operation of correcting image distortion caused by a lens (for example, lens shading correction (LSC)). As data outputted from the ISP 260, data resulting from correction of distortion included in the raw data is referred to as image data.

The memory 130 may store data related to the processor 120. The memory 130 may include a volatile memory such as a random access memory (RAM) including a static RAM (SRAM) or a dynamic RAM (DRAM), or may include a nonvolatile memory including a read only memory (ROM), a magnetoresistive RAM (MRAM), a spin-transfer torque MRAM (STT-MRAM), a phase-change RAM (PRAM), a resistive RAM (RRAM), and a ferroelectric RAM (FeRAM), as well as a flash memory, an embedded multi media card (eMMC), a solid state drive (SSD), or the like. The memory 130 may store one or more instructions related to an application or an operating system (OS).

The processor 120 may execute one or more instructions stored in the memory 130. The processor 120 may include a circuit for processing data, for example, at least one of an IC, an ALU, an FPGA, and an LSI. The processor 120 may process image data of the ISP 260 or raw data of the image sensor 230. The processor 120 may further include an image processing module 420 to process image data of the ISP 260 or raw data of the image sensor 230. The image processing module 420 may be an auxiliary processor (for example, the auxiliary processor 123 of FIG. 1) included in the processor 120. The image processing module 420 may be a thread or a process executed by an application or an operating system.

The display 410 may be included as at least part of a display device (for example, the display device 160 of FIGS. 1, 2, and 3). The display 410 may visually output information to the user by using at least one of an organic light emitting diode (OLED), a liquid crystal display (LCD), and a light emitting diode (LED). A touch sensor panel (TSP) (not shown) may further be included in the display 410 to control a user interface (UI) outputted through the display 410 more intuitively. The touch sensor panels may detect a position of a touch on the display 410 or an object hovering over the display 410 (for example, a user's finger, a stylus) by using at least one of a resistive film, capacitive components, surface acoustic wave, and infrared rays. According to various embodiments, the processor 120 of the electronic device 101 may obtain an image obtained by capturing an outside of the electronic device 101, based on at least one of the image sensor 230 or the ISP 260. The processor 120 may display the obtained image on the display 410.

The communication module 190 may connect at least one external electronic device (for example, the first external electronic device 310 and the plurality of second external electronic devices of FIG. 4) distinct from the electronic device 101, and the electronic device 101, based on a wireless network such as Bluetooth, Wireless Fidelity (WiFi), near field communication (NFC), long term evolution (LTE), and a wired network such as a local area network (LAN), Ethernet. The communication module 190 may include at least one of a communication circuit supporting a wireless network or a wired network, a communication processor (CP), and a communication interface. According to various embodiments, the electronic device 101 may identify the first external electronic device 310 based on the communication module 190. In response to the first external electronic device 310 being identified, the electronic device 101 may transmit raw data or image data to the first external electronic device 310. The raw data or image data transmitted to the first external electronic device 310 by the electronic device 101 may be data in which simple image processing (for example, LSC) is performed.

After transmitting the raw data or the image data to the first external electronic device 310, the electronic device 101 may receive information related to the transmitted raw data or image data (for example, the first information 312 of FIG. 3) from the first external electronic device 310. The electronic device 101 may adjust the image outputted on the display 410, based on the information received from the first external electronic device 310. The electronic device 101 may store the outputted image or the image adjusted based on the information received from the first external electronic device 310 in the memory 130, based on a user input.

The electronic device 101 may change a UI related to the image outputted on the display 410, based on the information received from the first external electronic device 310. For example, the electronic device 101 may output one or more visual elements floated on the image outputted on the display 410, based on the information received from the first external electronic device 310. The visual element may include at least one of a text, a cursor, a dot, a segment, a figure, an image, an animation, or a button outputted on the display 410.

The first external electronic device 310 may be connected with one or more electronic devices 101 through a wireless network or a wired network. In an embodiment, the first external electronic device 310 may correspond to a cloud camera server which processes an image delivered from the one or more electronic device 101. The first external electronic device 310 may analyze raw data or image data transmitted from the one or more electronic devices 101 connected thereto, and then may generate information including a result of analyzing the raw data or the image data. The generated information may be transmitted to the electronic device 10 which has transmitted the raw data or the image data. The first external electronic device 310 may include at least one of a communication module 430, a processor 440, and a repository 315. The communication module 430, the processor 440, and the repository 315 may be electrically connected with one another through a communication bus.

The first external electronic device 310 may receive raw data or image data transmitted from the communication module 190 of the electronic device 101 through the communication module 430. The communication module 430 may include at least one of a communication circuit supporting a wireless network or a wired network, a communication processor, and a communication interface, similarly to the communication module 190.

The repository 315 of the first external electronic device 310 may store data related to the processor 440. The data may include raw data or image data received through the communication module 430 and obtained in the electronic device 101. The data may include one or more instructions executed by the processor 440. The repository 315 may include a volatile memory or a nonvolatile memory similarly to the memory 130.

The processor 440 of the first external electronic device 310 may execute one or more instructions stored in the repository 315. The processor 440 may include a circuit for processing data, for example, at least one of an IC, an ALU, an FPGA, and an LSI. The processor 440 may process raw data or image data received through the communication module 430. The processor 440 may further include at least one of an image processing module 460, an image recognition module 450, or an image recognition information generation module 470 related to the received raw data or image data. Each of the image processing module 460, the image recognition module 450, or the image recognition information generation module 470 may be one or more auxiliary processors included in the processor 440. Each of the image processing module 460, the image recognition module 450, or the image recognition information generation module 470 may be one or more process or one or more threads executed by an application or an operating system.

In response to the raw data or image data obtained in the first external electronic device 310 being identified, the processor 440 may perform image processing with respect to the identified raw data or image data, based at least on the image processing module 460. The raw data or image data image-processed by the image processing module 460 may be delivered to the image recognition module 450 from the image processing module 460. The processor 440 may perform image recognition with respect to the image-processed raw data or image data, based at least on the image recognition module 450.

The image recognition may refer to an operation of identifying an object included in the raw data or the image data. For example, the processor 440 may identify a character, a code, a trademark, a product, or a landmark included in the raw data or image data, based at least on the image recognition module 450. For example, the processor 440 may determine which of designated types or designated categories the raw data or image data is included in, based at least on the image recognition module 450. The designated types or designated categories may be based on, for example, a person, a landscape, or food.

A result of performing image recognition with respect to the raw data or image data based on the image recognition module 450 may be delivered to the image recognition information generation module 470 from the image recognition module 450. The processor 440 may generate information (for example, the first information 312 of FIG. 3) including the result of performing the image recognition, based at least on the image recognition information generation module 470. The information generated in the image recognition information generation module 470 may be information regarding an object included in the raw data or the image data. In an embodiment, the information including the result of performing image recognition may correspond to recipe information. The information generated in the image recognition information generation module 470 may include at least one of a type of the object recognized in the raw data or the image data, a position of the object in the raw data or the image data, or data necessary for generating a visual element corresponding to the object.

The processor 440 may transmit, to the electronic device 101 through the communication module 430, the information generated based on the image recognition information generation module 470 and including the result of performing the image recognition with respect to the raw data or the image data. The processor 120 may store the received result in the memory 130 in response to the result of performing the image recognition with respect to the raw data or image data, transmitted from the communication module 430, being received through the communication module 190. The processor 120 may perform image processing with respect to the raw data or image data according to the received result, based at least on the image processing module 420.

The processor 440 may request at least one of the plurality of second external electronic devices 320-1, 320-2, . . . , 320-5 connected with the first external electronic device 310 to provide information related to the raw data or the image data. The processor 440 may perform image processing according to the result of performing the image recognition with respect to at least part of the raw data or the image data, based at least on the image processing module 460.

The image-processed at least part of the raw data or image data may be transmitted to at least one of the second external electronic devices 320-1, 320-2, . . . , 320-5 through the communication module 430. For example, a part of the raw data or image data to be transmitted to the second external electronic device 320-1 for a character recognition service may be changed to have a relatively high resolution. For example, a part of the raw data or image data to be transmitted to the second external electronic device 320-2 for an image search service may be changed to have a relatively low resolution. The image-processed at least part of the raw data or image data may be stored in the repository 315.

The first external electronic device 310 may be connected with the plurality of second external electronic devices 320-1, 320-2, . . . , 320-5 through a wireless network or a wired network. The first external electronic device 310 may access at least one of the plurality of second external electronic devices 320-1, 320-2, . . . , 320-5 based on information generated in the image recognition information generation module 470. The operation of accessing at least one of the plurality of second external electronic devices 320-1, 320-2, . . . , 320-5 may include an operation of transmitting at least part of the raw data or the image data. Each of the plurality of second external electronic devices 320-1, 320-2, . . . , 320-5 may correspond to a third party cloud server which is operated by a service provider to provide a specific service.

For example, the second external electronic device 320-1 may be a server that provides text data corresponding to characters from an image including the characters, based on optical character reader/recognition (OCR), or provides text data including a result of translating the characters. For example, the second external electronic device 320-2 may be a server that provides an image search service to search based on an image of a subject included in the raw data or the image data. For example, the second external electronic device 320-3 may be a server that provides a result of searching a product related to a subject included in the raw data or image data. For example, the second external electronic device 320-4 may be a server that recognizes a trademark included in the raw data or the image data, and provides a service based on the recognized trademark. For example, the second external electronic device 320-5 may be a server that provides a service based on a geographical position where the raw data or the image data is obtained.

According to various embodiments, the electronic device 101 may include the image sensor 230, the display 410, a communication circuit, the memory 130 storing a plurality of instructions, and at least one processor 120 operably coupled to the image sensor 230, the display 410, the communication circuit, and the memory 130. When being executed, the plurality of instructions may cause the at least one processor 120 to obtain an image from the image sensor 230, to display the obtained image on the display 310 in response to the image being obtained, to identify multiple portions corresponding to a plurality of designated types in the image, based at least on the first external electronic device 310 connected by using the communication circuit, to display a plurality of visual elements overlaid on the multiple portions in the displayed image in response to the multiple portions being identified, and to change display of the plurality of visual elements based at least on the plurality of second external electronic devices 320-1, 320-2, . . . , 320-5 distinct from the first external electronic device 310 and corresponding to the plurality of designated types, respectively. The plurality of visual elements may have distinct shapes according to the types corresponding to the portions overlaid on the plurality of visual elements from among the plurality of designated types.

According to various embodiments, the first external electronic device 310 may include a communication circuit, a memory, and at least one processor 440. The at least one processor 440 may receive a first image from the electronic device 101 by using the communication circuit, may perform image recognition with respect to the first image by using the first image, and may generate information regarding an external object included in the first image, based on a result of the recognizing. Based on the information regarding the external object satisfying a first designated condition, the at least one processor 440 may transmit at least a portion of the first image to a second external electronic device corresponding to the first designated condition from among the plurality of second external electronic devices 320-1, 320-2, . . . , 320-5. Based on the information regarding the external object satisfying a second designated condition, the at least one processor 440 may transmit the at least portion of the first image to a second external electronic device corresponding to the second designated condition from among the plurality of second external electronic devices 320-1, 320-2, . . . , 320-5.

Figure 5:
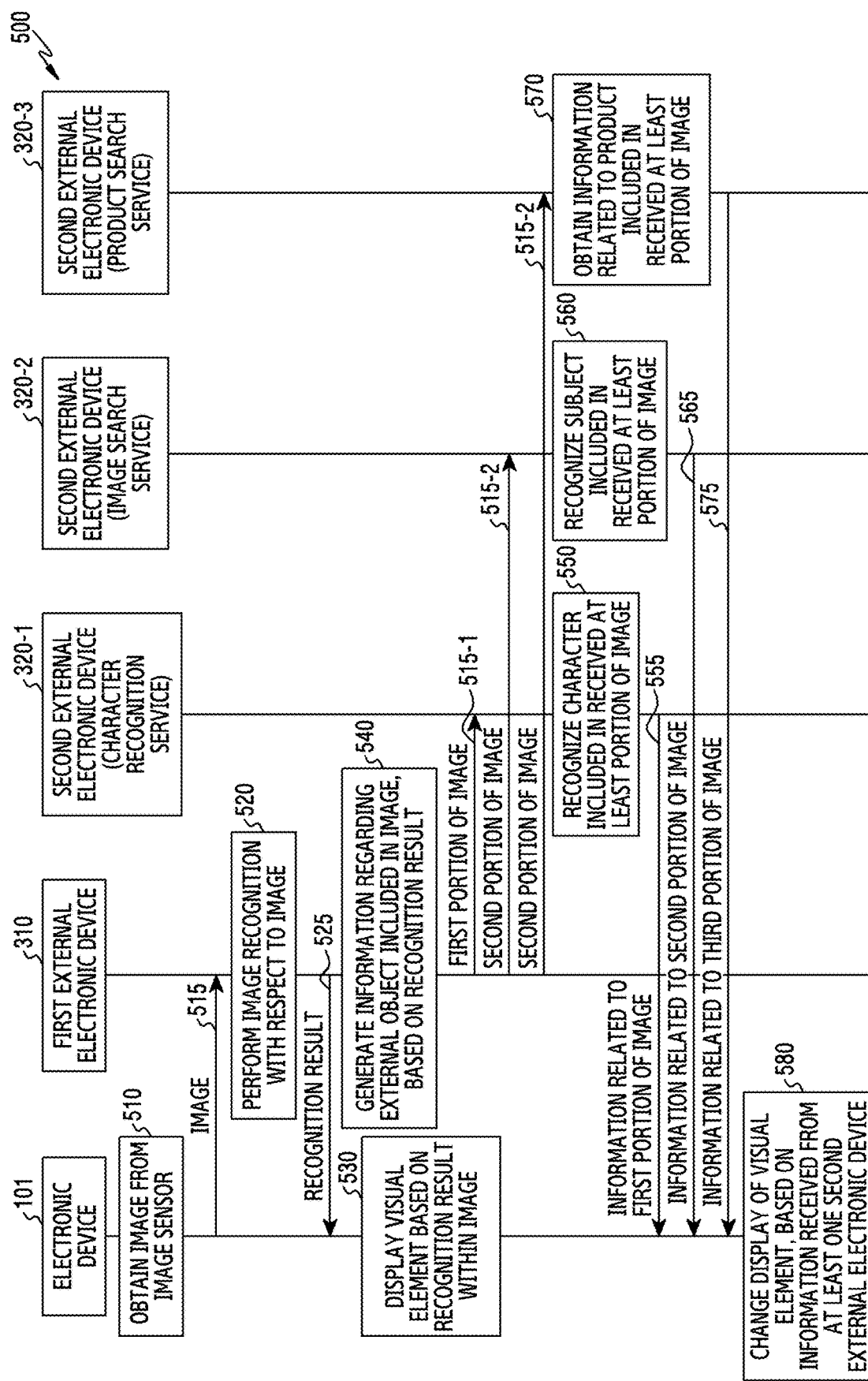
FIG. 5 illustrates a signal flowchart to explain operations performed by an electronic device, a first external electronic device, and a plurality of second external electronic devices according to various embodiments.

FIG. 5 illustrates a signal flowchart 500 to explain operations performed by an electronic device 101, a first external electronic device 310 and a plurality of second external electronic devices 320-1, 320-2, 320-3 according to various embodiments. The electronic device 101 of FIG. 5 may correspond to the electronic device 101 of FIGS. 1, 2, 3, and 4. The first external electronic device 310 of FIG. 5 may correspond to the first external electronic device 310 of FIGS. 3 and 4. The plurality of second external electronic devices 320-1, 320-3, 320-3 of FIG. 5 may be related to the second external electronic device 320 of FIGS. 3 and 4.

Referring to FIG. 5, in operation 510, the electronic device 101 according to various embodiments may obtain an image from an image sensor. Operation 510 may be performed based on a user input related to image recognition. For example, a user of the electronic device 101 may execute a specific application for image recognition. The electronic device 101 may obtain an image from the image sensor based on the executed specific application. The electronic device 101 may display the obtained image in a UI identified from the specific application.

The electronic device 101 according to various embodiments may transmit the obtained image to the first external electronic device 310. The image 515 transmitted from the electronic device 101 to the first external electronic device 310 may be, for example, raw data (for example, the raw image 301 of FIG. 3) obtained from the image sensor (for example, the image sensor 230 of FIGS. 2, 3, and 4). The electronic device 101 may continuously obtain images from the image sensor at designated intervals. In an embodiment, the electronic device 101 may transmit the continuously obtained images to the first external electronic device 310, based on a difference between the continuously obtained images. For example, when the difference between the continuously obtained images is greater than or equal to a designated threshold value, the electronic device 101 may transmit the continuously obtained images to the first external electronic device 310.

In response to the image 515 being received from the electronic device 101, the first external electronic device 310 may perform image recognition with respect to the received image 515 in operation 520. The image recognition in operation 520 may include at least one of classification of scenes of the image 515, and classification of external objects included in the image 515. The first external electronic device 310 may transmit a recognition result 525 on the image 515 to the electronic device 101. The recognition result 525 may be processed by all of the electronic device 101 and the first external electronic device 310. The recognition result 525 may include a result of classifying scenes related to the image 515, and a result of identifying external objects included in the image 515.

In response to the recognition result 525 received from the first external electronic device 310, the electronic device 101 may display a visual element based on the recognition result 525 within the image. The visual element may be overlaid on the image displayed within the display at least in part. A shape of the visual element or information included in the visual element may be related to information included in the recognition result 525, for example, the result of classifying the scenes related to the image 515, and the result of identifying the external objects included within the image 515. The shape of the visual element may be a bubble shape floating on the image of the electronic device 101. The recognition result 525 that the electronic device 101 receives and the visual element based on the recognition result 525 will be described in detail with reference to FIGS. 10A and 10B.

Referring to FIG. 5, in operation 540, the first external electronic device 310 may generate information regarding the external object included in the image 515, based on the recognition result 525. The information may include the result of classifying the scenes related to the image 515, and the result of identifying the external object included in the image 515. The first external electronic device 310 may identify one or more second external electronic devices to transmit at least a portion of the image 515 from among the plurality of second external electronic devices 320-1, 320-2, 320-3, based on the generated information. For example, the first external electronic device 310 may identify a second external electronic device to transmit at least portion of the image 515, based on a condition satisfied by the information regarding the external object from among designated conditions.

For example, when the object detected in the image 515 is recognized as a bag, the first external electronic device 310 may determine to provide a service based on the second external electronic device 320-3 related to search of a product. For example, when the object detected in the image 515 is a landmark, the first external electronic device 310 may determine to provide a service based on the second external electronic device (for example, the second external electronic device 320-5 of FIG. 4) which recognizes a place where the landmark exists. Since the first external electronic device 310 selects at least one of the plurality of second external electronic devices 320-1, 320-2, 320-3 based on the result of recognizing the image 515, the number of queries transmitted from the first external electronic device 310 to the plurality of second external electronic devices 320-1, 320-3, 320-3 may be reduced. For example, the number of dummy queries transmitted to a second external electronic device having nothing to do with the image 515 from among the plurality of second external electronic devices 320-1, 320-2, 320-3 may be reduced.

In response to one or more second external electronic device to transmit at least a portion of the image 515 being identified from among the plurality of second external electronic devices 320-1, 320-2, 320-3, the first external electronic device 310 may transmit at least a portion of the image 515 to the identified second external electronic device. In the example of FIG. 5, the first external electronic device 310 may transmit a first portion 515-1 of the image 515 to the second external electronic device 320-1 providing a character recognition service. For example, the first external electronic device 310 may transmit, to the second external electronic device 320-1, a query signal requesting information related to the first portion 515-1. The query signal may include image data corresponding to the first portion 515-1. The query signal may include an identifier of the first external electronic device 310 or the electronic device 101.

In the example of FIG. 5, the first external electronic device 310 may transmit a second portion 515-2 of the image 515 to the second external electronic device 320-2 providing an image recognition service. In the example of FIG. 5, the first external electronic device 310 may transmit the second portion 515-2 of the image 515 to the second external electronic device 320-3 providing a product search service. Referring to FIG. 5, the second portion 515-2 may be transmitted to the plurality of second external electronic devices 320-2, 320-3. While transmitting the first portion 515-1 or the second portion 515-2, the first external electronic device 310 may transmit identification information of the electronic device 101 (for example, at least one of an IP address, a MAC address, or a port number as network information of the electronic device 101) along with the first portion 515-1 or second portion 515-2. The first external electronic device 310 may request the plurality of second external electronic devices 320-1, 320-2, 320-3 to transmit information related to the received portions of the image 515 to the electronic device 101.

The first external electronic device 310 may obtain at least one of the first portion 515-1 or the second portion 515-2 by performing at least one of an operation of classifying the image 515, an operation of cutting a portion of the image 515, an operation of magnifying a portion of the image 515, an operation of adjusting a parameter of the image 515, or an operation of changing image quality of the image 515. The first portion 515-1 or the second portion 515-2 that the first external electronic device 310 transmits to at least one of the plurality of second external electronic devices 320-1, 320-3, 320-3 may have different quality. The quality of the first portion 515-1 or the second portion 515-2 may be different from quality of portions corresponding to the first portion 515-1 or the second portion 515-2 within the image 515. For example, the quality of the first portion 515-1 transmitted to the second external electronic device 320-1 providing the character recognition service may be relatively higher than the quality of the second portion 515-2 transmitted to the second electronic device 320-2 providing the image recognition service. For example, a resolution or sharpness of the first portion 515-1 may be higher than a resolution or sharpness of the second portion 515-2.

The plurality of second external electronic devices 320-1, 320-2, 320-3 which receive the portions of the image may perform operations 550, 560, 570 based on the received portions. Referring to FIG. 5, in operation 550, the second external electronic device 320-1 may identify a character included in the received first portion 515-1. The second external electronic device 320-1 may generate information 555 including text data corresponding to the identified character. The generated information 555 may be transmitted to the first external electronic device 310 or the electronic device 101. For example, when the first external electronic device 310 transmits the first portion 515-1 and the identifier of the electronic device 101 to the second external electronic device 320-1, the second external electronic device 320-1 may transmit the information 555 including the text data to the electronic device 101.

Referring to FIG. 5, in operation 560, the second external electronic device 320-2 may identify a subject included in the received second portion 515-2. The second external electronic device 320-2 may obtain information 565 related to the identified subject, based on a search engine of a network. The second external electronic device 320-2 may transmit the obtained information 565 to the electronic device 101.

Referring to FIG. 5, in operation 570, the second external electronic device 320-3 may obtain information 575 related to a product included in the received second portion 515-2. The second external electronic device 320-3 may obtain the information 575 related to the product included in the second portion 515-2, based on a shopping service of a network. The information 575 may include at least one of a merchandiser selling the product, a prices of the product, or an address of a website where the product is sold. The second external electronic device 320-3 may transmit the obtained information 575 to the electronic device 101.

Referring to FIG. 5, in response to at least one piece of information of the information 555, 565, 575 being received, the electronic device 101 may change display of the visual element related to the image in operation 580. In an embodiment, the electronic device 101 may change the display of the visual element overlaid on the image based on operation 503. In an embodiment, the electronic device 101 may further output a visual element related to at least one piece of information of the information 555, 565, 575 on the image displayed within the display. The operation of changing the display of the visual element or outputting an additional visual element based on at least one piece of information of the information 555, 565, 575 will be described in detail with reference to FIGS. 6A, 6B, 6C, and 6D.

According to various embodiments, the electronic device 101 may output the image obtained from the image sensor within the display in real time. While outputting the image obtained from the image sensor in real time, the electronic device 101 may further output results of recognizing the different portions of the image from the plurality of second external electronic devices 320-1, 320-2, 320-3 based on operation 580. The electronic device 101 may further display the results on the image, which is outputted in real time, in real time, thereby providing information related to the object captured by the image sensor to the user of the electronic device 101 more intuitively.

Figure 6A:
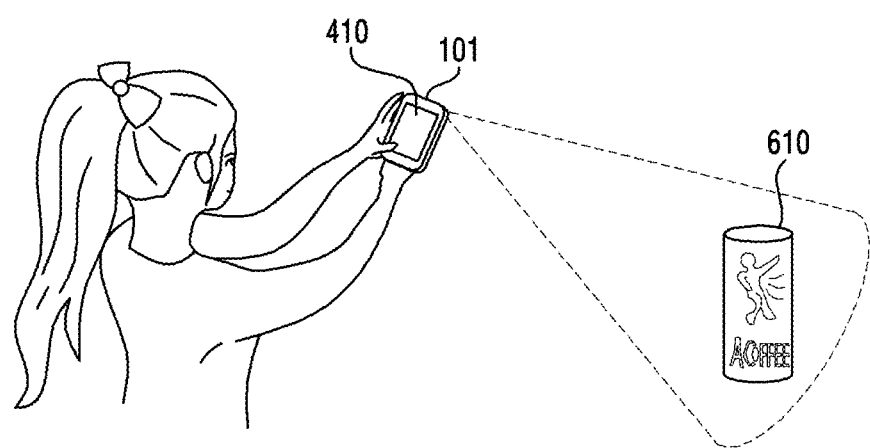
FIG. 6A illustrates a view to explain an example of an operation of an electronic device recognizing a subject included in an image according to various embodiments.
Figure 6B:
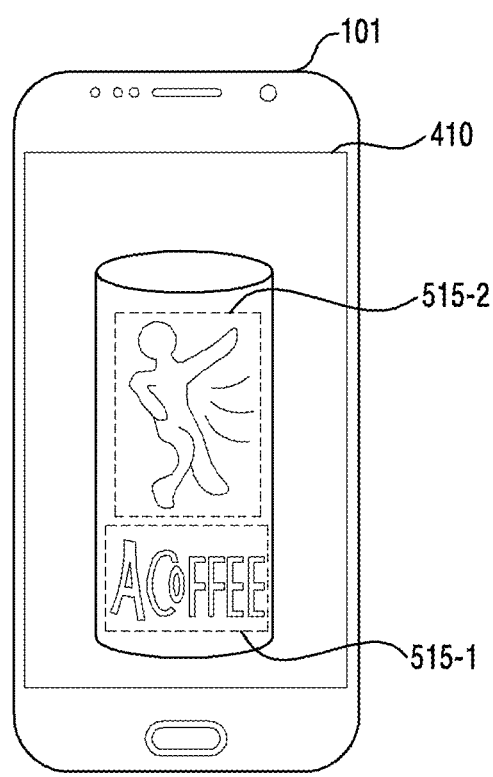
FIG. 6B illustrates a view to explain an example of the operation of the electronic device recognizing the subject included in the image according to various embodiments.
Figure 6C:
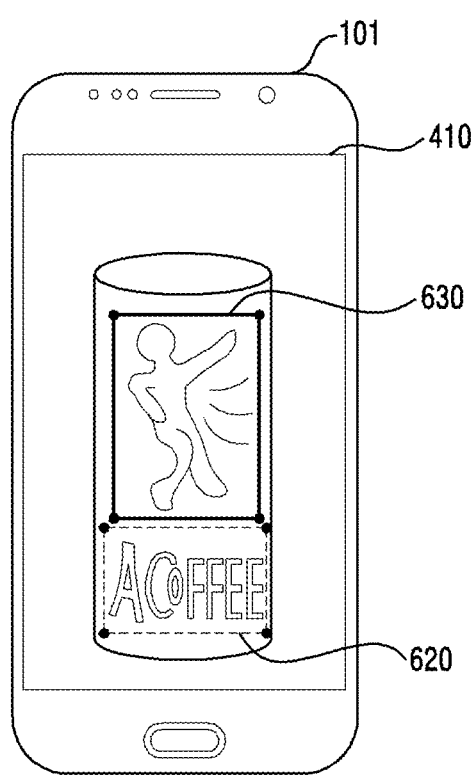
FIG. 6C illustrates a view to explain an example of the operation of the electronic device recognizing the subject included in the image according to various embodiments.
Figure 6D:
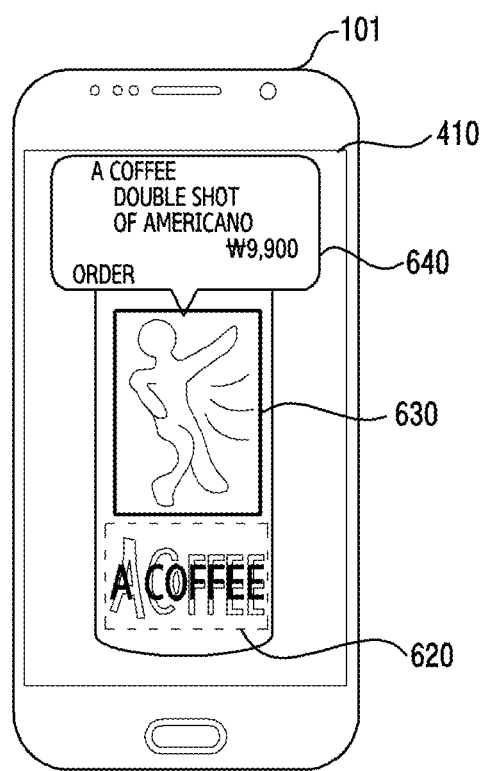
FIG. 6D illustrates a view to explain an example of the operation of the electronic device recognizing the subject included in the image according to various embodiments.

FIG. 6A is a view illustrating an example of an operation of an electronic device 101 recognizing a subject 610 included in an image according to various embodiments, FIG. 6B is a view illustrating the example of the operation of the electronic device 101 recognizing the subject 610 included in the image according to various embodiment, FIG. 6C is a view illustrating the example of the operation of the electronic device 101 recognizing the subject 610 included in the image according to various embodiment, and FIG. 6D is a view illustrating the example of the operation of the electronic device 101 recognizing the subject 610 included in the image according to various embodiment. The electronic device 101 of FIGS. 6A, 6B, 6C, and 6D may correspond to the electronic device 101 of FIGS. 1, 2, 3, and 4. The operation of the electronic device 101 described with reference to FIGS. 6A, 6B, 6C, and 6D may be based on the operations of FIG. 5, for example.

Referring to FIG. 6A, the electronic device 101 may obtain an image including the subject 610 from the image sensor, based on operation 510 of FIG. 5, for example. The electronic device 101 may output the obtained image within the display 410. A user of the electronic device 101 may move the image sensor of the electronic device 101 toward the subject 610. The image outputted within the display 410 may be changed based on the image obtained from the moving image sensor according to the movement of the image sensor of the electronic device 101.

When the image sensor of the electronic device 101 is toward the subject 610, the electronic device 101 may output an image including the subject 610 within the display 410 as shown in FIG. 6B. The electronic device 101 may output the image based on raw data, which is obtained from the image sensor, within the display 410, and simultaneously, may transmit the raw data to a first external electronic device (not shown) connected with the electronic device 101. The first external electronic device may correspond to the first external electronic device 310 of FIGS. 3, 4, and 5.

The first external electronic device which receives the raw data may identify the subject 610 captured by the image sensor, based on operation 520 of FIG. 5, for example. In an embodiment, the first external electronic device may identify a plurality of portions 515-1, 515-2 within the image obtained from the image sensor, based on the raw data. Each of the plurality of identified portions 515-1, 515-2 may be a portion of the image that may be used to provide a service related to the user. For example, at least one portion identified by the first external electronic device may be included in the remaining portions except for a portion like a background of the subject 610 within the image.

Referring to FIG. 6B, the plurality of identified portions 515-1, 515-2 may be related to at least a portion of the subject 610. For example, the portion 515-1 may correspond to an area within the image in which characters printed on the subject 610 are captured. For example, the portion 515-1 may include only pixels related to characters from among a plurality of pixels within the image. For example, the portion 515-2 may correspond to an area within the image in which a figure, a picture, or a trademark printed on the subject 610 is captured. For example, the portion 515-2 may include only pixels related to the figure, picture, or trademark printed on the subject 610 from among the plurality of pixels within the image. Although not shown, a portion within the image identified by the first external electronic device may include all of the pixels related to the subject 610 from among the plurality of pixels within the image to enable a type of the subject 610 to be identified.

In response to the plurality of portions 515-1, 515-2 being identified, the first external electronic device may identify a second external electronic device that is related to each of the plurality of portions 515-1, 515-2 from among a plurality of second external electronic devices (for example, the second external electronic devices 320-1, 320-2, . . . , 320-5 of FIG. 4) connected with the first external electronic device. For example, the first external electronic device may allocate or map at least one of the plurality of second external electronic devices to the plurality of portions 515-1, 515-2, respectively. Mapping the second external electronic devices and the portions of the image may be based on types of external objects captured within the portions.

Referring to FIG. 6B, since the portion 515-1 within the image includes one or more characters, the first external electronic device may map a second external electronic device (for example, the second external electronic device 320-1 of FIGS. 4 and 5) for character recognition from among the plurality of second external electronic devices, and the portion 515-1. Since the portion 515-2 within the image includes a trademark, the first external electronic device may map a second external electronic device (for example, the second external electronic device 320-4) for recognizing a trademark from among the plurality of second external electronic devices, and the portion 515-2. When external objects captured in the different portions 515-1, 515-2 in the single image are different from each other, the single image may be mapped onto the plurality of second external electronic devices.

In response to the plurality of portions 515-1, 515-2 being identified, the first external electronic device may transmit a result of identifying the plurality of portions 515-1, 515-2 to the electronic device 101. The result may include at least one of a position of each of the plurality of portions 515-1, 515-2 within the image, a type of an external object captured in each of the plurality of portions 515-1, 515-2, or information related to a second external electronic device related to each of the plurality of portions 515-1, 515-2. For example, the first external electronic device may transmit, to the electronic device 101 as a result of identifying the portion 515-1, information indicating at least one of a position of the portion 515-1 within the image, a type of an external object existing within the portion 515-1 (for example, one or more characters), or a second external electronic device related to the portion 515-1 (for example, the second external electronic device 320-1 for character recognition shown in FIGS. 4 and 5).

For example, the first external electronic device may transmit, to the electronic device 101 as a result of identifying the portion 515-2, information indicating at least one of a position of the portion 515-2 within the image, a type of an external object existing within the portion 515-2 (for example, a trademark), or a second external electronic device related to the portion 515-2 (for example, the second external electronic device 320-4 for searching a product based on a trademark shown in FIG. 4). The operation that the first external electronic device performs based on the image received from the electronic device 101 will be described in more detail with reference to FIG. 7.

Referring to FIG. 6C, in response to the result of identifying the plurality of portions 515-1, 515-2 being received, the electronic device 101 may output a plurality of visual elements 620, 630 overlaid on the image displayed within the display 410, or floated on the image. The plurality of visual elements 620, 630 may correspond to the plurality of portions 515-1, 515-2, respectively. In an embodiment, respective positions of the plurality of visual elements 620, 630 within the image may correspond to the respective positions of the plurality of portions 515-1, 515-2 within the image that are received by the electronic device 101. The visual elements 620, 630 may have different shapes based on the result of identifying the plurality of portions 515-1, 515-2 that is received from the first external electronic device. For example, respective shapes of the visual elements 620, 630 may be different from each other according to the types of the plurality of portions 515-1, 515-2 or the second external electronic devices related to the plurality of portions 515-1, 515-2.

Referring to FIG. 6C, the electronic device 101 may output the visual elements 620, 630 having rectangular shapes corresponding to the plurality of portions 515-1, 515-2, respectively, on the image displayed within the display 410. Since the visual elements 620, 630 include a text and a trademark, respectively, the types of the plurality of portions 515-1, 515-2 corresponding to the visual elements 620, 630, respectively, may be different from each other.

In an embodiment, since the types of the plurality of portions 515-1, 515-2 are different from each other, the electronic device 101 may apply different colors to the visual elements 620, 630 (for example, red to the visual element 620 and blue to the visual element 630). In an embodiment, the electronic device 101 may determine types of segments to be used in the visual elements 620, 630, based on the types of the plurality of portions 515-1, 515-2. The electronic device 101 changing the shapes of the visual elements 620, 630 based on the types of the plurality of portions 515-1, 515-2 will be described in detail with reference to FIGS. 10A and 10B.

In an embodiment, the respective shapes of the visual elements 620, 630 may be changed based on a user input (for example, a gesture of dragging an anchor displayed on a vertex of the rectangle). In response to a user input for changing the shape of any one of the visual elements 620, 630, the electronic device 101 may transmit at least a portion of the image included in the changed visual element to the first external electronic device. The at least portion of the image transmitted may be used by the first external electronic device to provide a service based on an external object included in the portion.

In response to the plurality of portions 515-1, 515-2 being identified, the first external electronic device may transmit the plurality of identified portions 515-1, 515-2 to the second external electronic devices corresponding to the plurality of identified portions 515-1, 515-2. The plurality of second external electronic devices connected with the first external electronic device may correspond to third cloud servers for providing services distinct from one another to the user. When the first external electronic device maps the plurality of second external electronic devices different from one another to the plurality of portions 515-1, 515-2, the first external electronic device may cause the plurality of mapped second external electronic devices to provide different services provided by the plurality of mapped second external electronic devices to the user of the electronic device 101, simultaneously, by transmitting the plurality of portions 515-1, 515-2 to the plurality of mapped second external electronic devices. The different services are provided to the electronic device 101 simultaneously, such that contents or visual elements related to the different services are outputted within the display 410 of the electronic device 101, simultaneously.

Referring to FIG. 6B, since the portion 515-1 including characters and the portion 515-2 including the trademark coexist with each other within the image, the first external electronic device may determine to process the image based on the second external electronic device for character recognition (for example, the second external electronic device 320-1 of FIGS. 4 and 5), and the second external electronic device for recognizing a trademark (for example, the second external electronic device 320-4 of FIG. 4). The first external electronic device may transmit the portion 515-2 including the trademark to the second external electronic device for recognizing the trademark, while transmitting the portion 515-1 including the characters to the second external electronic device for character recognition. While transmitting the plurality of portions 515-1, 515-2 to the second external electronic devices which are different from each other, the first external electronic device may transmit information for identifying the electronic device 101 (for example, an IP address, a port number, a MAC address, or a combination thereof as network information of the electronic device 101) to the second external electronic devices which are different from each other.

In response to the information for identifying the electronic device 101 and the portion 515-1 being received from the first external electronic device, the second external electronic device for character recognition may generate text data corresponding to one or more characters captured within the portion 515-1. Based on the information for identifying the electronic device 101, the second external electronic device may transmit the generated text data to the electronic device 101. Similarly, in response to the information for identifying the electronic device 101 and the portion 515-2 being received from the first external electronic device, the second external electronic device for recognizing the trademark may search one or more products related to the trademark captured within the portion 515-2. The second external electronic device for recognizing the trademark may transmit the result of searching one or more products to the electronic device 101.

In response to data corresponding to the plurality of portions 515-1, 515-2 being received from the second external electronic devices which are different from each other, the electronic device 101 may combine the data received from the second external electronic devices different from each other, and may output the combined data on the image displayed within the display 410, as shown in FIG. 6D. The electronic device 101 may output the data received from the second external electronic devices different from each other, differently based on different types of visual elements.

In an embodiment, the electronic device 101 may change the visual elements 620, 630 displayed on the plurality of portions 515-1, 515-2 based on types of data corresponding to the plurality of portions 515-1, 515-2. In an embodiment, the electronic device 101 may change the visual elements 620, 630 displayed on the plurality of portions 515-1, 515-2 based on services provided to the plurality of portions 515-1, 515-2 and different from each other. In an embodiment, the electronic device 101 may change the visual elements 620, 630 displayed on the plurality of portions 515-1, 515-2, based on history information indicating activities performed by the user with respect to the image obtained from the image sensor.

In an embodiment, in response to the text data received from the second external electronic device for character recognition, the electronic device 101 may change the display of the visual element 620 corresponding to the portion 515-1 of the image including the characters. Referring to FIG. 6D, based on the text data received, the electronic device 101 may change the shape of the visual element 620 from the rectangle to one or more characters included in the text data. The text data may include a result of recognizing the one or more characters captured within the portion 515-1, or may include a result of translating the characters.

In an embodiment, in response to the data received from the second external electronic device for recognizing the trademark, the electronic device 101 may change the display of the visual element 620 corresponding to the portion 515-2 of the image including the trademark, or may output a visual element 640 related to the data adjacent to the visual element 630 on the image displayed within the display 410. The visual element 640 may have a shape of a bubble indicating the visual element 630 or the portion 515-2. The data received from the second external electronic device for recognizing the trademark, for example, a list of products related to the trademark captured within the portion 515-2, may be displayed in the bubble. A visual element (for example, a hyperlink or button) for moving to a web service (for example, a shopping mall site) related to the second external electronic device for recognizing the trademark may further be displayed in the bubble. In the bubble, a visual element for a user's additional input (for example, a search field for inputting a keyword or a drop-down field) may further be displayed.

Figure 7:
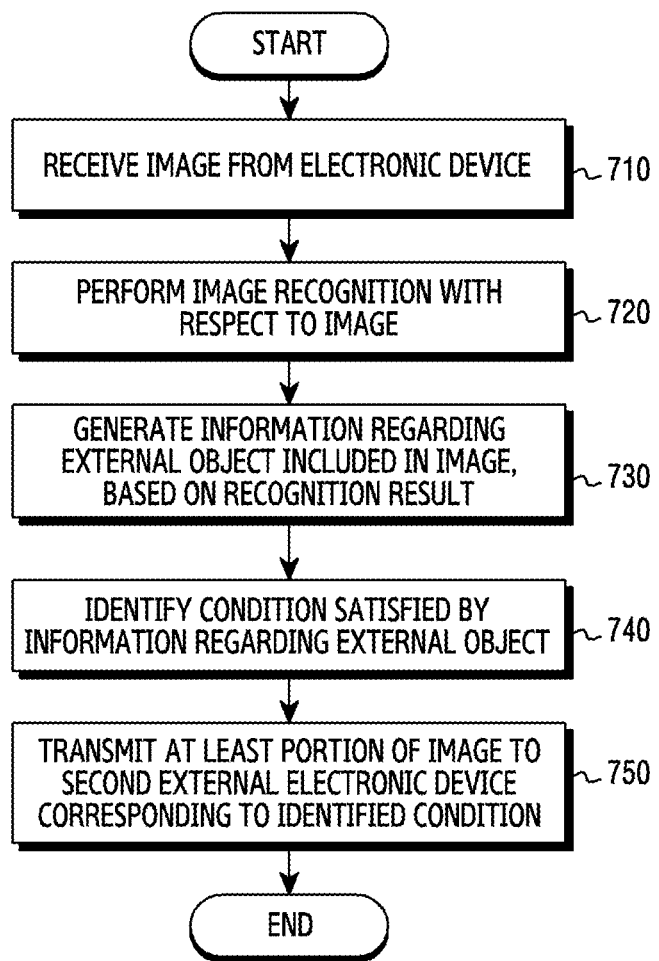
FIG. 7 illustrates a flowchart to explain operations of a first external electronic device connected to an electronic device according to various embodiments.

FIG. 7 illustrates a flowchart 700 to explain operations of a first external electronic device connected to an electronic device according to various embodiments. The electronic device of FIG. 7 may correspond to the electronic device 101 of FIGS. 1, 2, 3, 4, 5, 6A, 6B, 6C, and 6D. The first external electronic device of FIG. 7 may correspond to the first external electronic device 310 of FIGS. 3, 4, and 5. At least one of the operations of FIG. 7 may be formed by, for example, the processor 440 of the first external electronic device 310 of FIG. 4. In an embodiment, the first external electronic device may be a cloud camera server which is connected with a plurality of electronic devices, and processes images of camera modules included in the plurality of electronic devices connected.

Referring to FIG. 7, in operation 710, the first external electronic device according to various embodiments may receive an image from the electronic device. The first external electronic device may receive an image obtained from the image sensor of the electronic device based on operation 510 of FIG. 5, from the electronic device. A format of the image received by the first external electronic device may correspond to, for example, a format of a raw image. The first external electronic device may obtain information for identifying the electronic device while receiving the image from the electronic device.

Referring to FIG. 7, in operation 720, the first external electronic device according to various embodiments may perform image recognition with respect to the image. The first external electronic device may identify one or more external objects captured within the image. The first external electronic device may classify a plurality of pixels included in the image into any one of a foreground object or a background object. When a plurality of external objects are included in the image, the first external electronic device may classify the plurality of pixels included in the image into a plurality of groups corresponding to the plurality of objects, respectively. The first external electronic device may perform image recognition based on a key point, a region of interest (RoI) identified within the image. In an embodiment, image recognition based on deep learning, neural network may be performed.

Referring to FIG. 7, in operation 730, the first external electronic device according to various embodiments may generate information regarding the external object included in the image based on a recognition result. The information regarding the external object may include at least one of a position of the external object within the image, a type of the external object, adjustment information corresponding to the external object, or reliability of the recognition result. In an embodiment, the reliability of the recognition result may refer to a degree of correspondence of the identified external object to any one of a plurality of designated types. In an embodiment, the reliability of the recognition result may correspond to accuracy of image recognition. The information generated based on operation 730 may correspond to the first information 312 of FIG. 3, for example.

The first external electronic device may transmit the generated information regarding the external object to the electronic device. Based on the transmitted information, the electronic device may output a visual element indicating a position of the external object within the image displayed for the user. Based on the adjustment information corresponding to the external object, the electronic device may perform image processing (or image adjustment) with respect to a portion including the object within the image. The image adjustment may be related to at least one of edge enhancement, sharpening, blur, color contrast. For example, based on the adjustment information, the electronic device may perform image processing such as edge enhancement or sharpening with respect to a portion including a text within the image. For example, based on the adjustment information, the electronic device may perform image processing such as color contrast with respect to a portion including a trademark within the image.

Referring to FIG. 7, in operation 740, the first external electronic device according to various embodiments may identify a condition satisfied by the information of the external object. The first external electronic device may identify one or more conditions satisfied by the identified external object from among a plurality of designated conditions. The plurality of designated conditions may correspond to a plurality of second external electronic devices connected with the first external electronic device, respectively, or may be provided from the plurality of second external electronic devices. The plurality of designated conditions may be related to a type of the external object.

In response to the one or more conditions satisfied by the external object being identified, the first external electronic device may identify one or more second external electronic devices to transmit the portion of the image that includes the external object. Referring to FIG. 7, in operation 750, the first external electronic device according to various embodiments may transmit at least a portion of the image to the second external electronic device corresponding to the identified condition. In an embodiment, the first external electronic device may transmit information related to the identified one or more conditions to the electronic device.

For example, in response to existence of a text included in the external object being identified by the information regarding the external object, the first external electronic device may determine that the information regarding the external object satisfies a first condition. Based the information regarding the external object satisfying the first condition, the first external electronic device may transmit a portion of the image in which the text included in the external object is captured to a second external electronic device configured to recognize the text (or a second external electronic device providing the first condition). The first external electronic device may adjust the portion of the image to be transmitted to the second external electronic device. For example, the first external electronic device may perform edge enhancement related to the text, based on the adjustment information.

In an embodiment, when transmitting the portion of the image to the second external electronic device, the first external electronic device may also transmit information regarding the electronic device (for example, identification information of the electronic device). The information transmitted along with the portion of the image may be used for the second external electronic device to transmit information that is generated by using the portion of the image to the electronic device.

For example, in response to a product included in the external object being identified by the information regarding the external object, the first external electronic device may determine that the information regarding the external object satisfies a second condition. Based on the information regarding the external object satisfying the second condition, the first external electronic device may transmit a portion of the image in which the product is captured to a second external electronic device corresponding to the second condition (for example, the second external electronic device 320-2 providing the product search service, shown in FIG. 4). The first external electronic device may adjust the portion of the image to be transmitted to the second external electronic device. For example, the first external electronic device may adjust a resolution of the image (for example, down-scale) or may adjust color contrast based on the adjustment information.

In response to a plurality of conditions satisfied by one external object being identified, the first external electronic device may transmit a portion of the image including the external object to the plurality of second external electronic devices corresponding to the plurality of identified conditions, respectively. For example, when a specific portion within the image corresponds to a trademark or an image, the first external electronic device may transmit the specific portion to the second external electronic device recognizing a trademark and another second external electronic device searching an image. In an embodiment, based on reliability of a recognition result, the first external electronic device may exclude one or more second external electronic devices from the plurality of second external electronic devices corresponding to the plurality of identified conditions. In an embodiment, based on the reliability of the recognition result, the first external electronic device may determine respective priorities of the plurality of second external electronic devices corresponding to the plurality of identified conditions.

According to various embodiments, the electronic device may transmit an image obtained from the image sensor to the first external electronic device in real time. In response to the image being received, the first external electronic device may transmit at least a portion of the image to at least one second external electronic device by performing the operations of FIG. 7. In response to the at least portion of the image being received, the second external electronic device may obtain information corresponding to the received portion. The obtained information may be transmitted to the electronic device by the second external electronic device or the first external electronic device in real time. The electronic device may receive information corresponding to a plurality of portions of the image from the plurality of second external electronic devices in real time. In response to the information corresponding to the plurality of portions being received, the electronic device may display the received information on the obtained image in real time.

According to various embodiments, the electronic device may provide the user with a plurality of services related to the single image captured by the electronic device (or any one image of a plurality of images stored in the electronic device), based on the first external electronic device and the plurality of second external electronic devices connected with the first external electronic device. Even when the user does not select at least one of the plurality of second external electronic devices or the plurality of services, the electronic device may provide the plurality of services related to the single image to the user simultaneously, or display a plurality of visual elements related to the plurality of services simultaneously, thereby guiding the user to easily enter at least one of the plurality of services.

Figure 8:
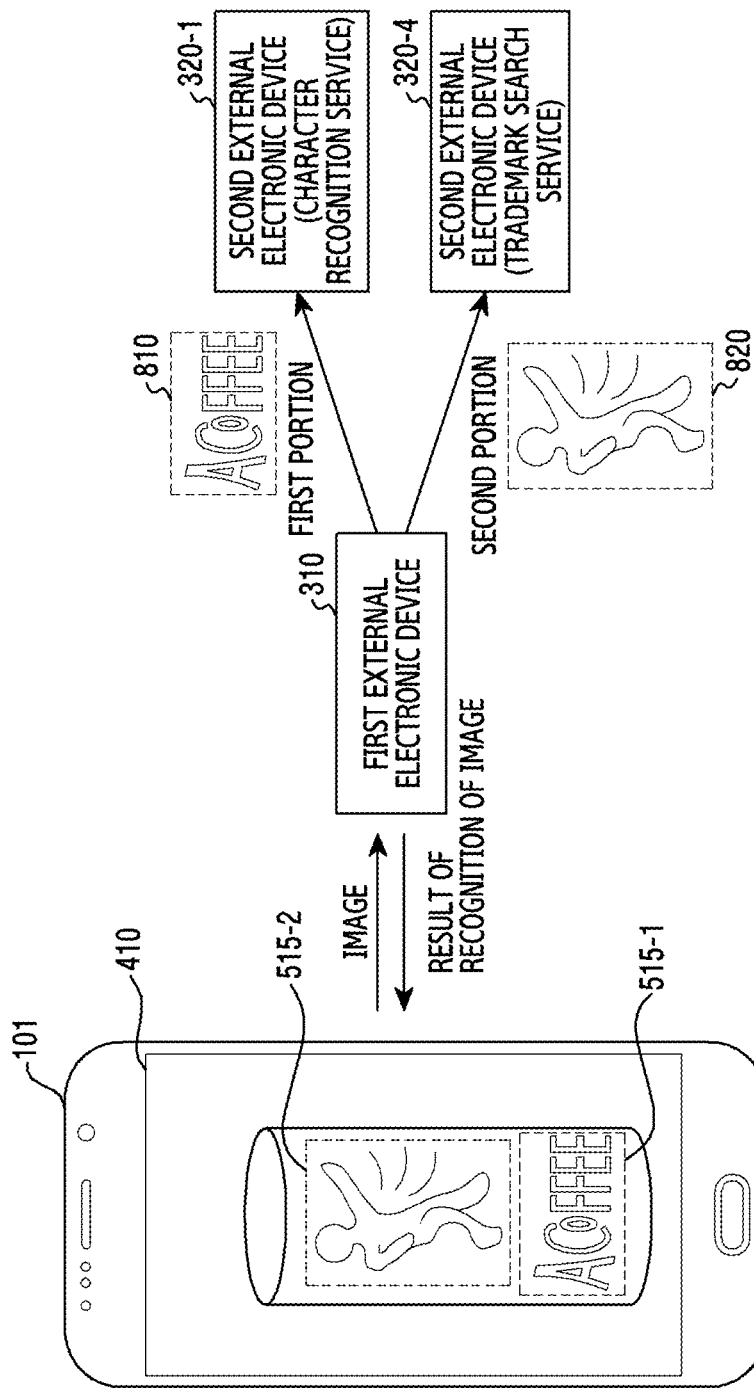
FIG. 8 illustrates a view to explain an operation of a first external electronic device transmitting, to a plurality of second external electronic devices, a plurality of portions extracted from an image of an electronic device according to various embodiments.

FIG. 8 illustrates a view to explain an operation of a first external electronic device 310 transmitting a plurality of portions extracted from an image of an electronic device 101 to a plurality of second external electronic devices 320-1, 320-4 according to various embodiments. The electronic device 101 of FIG. 8 may correspond to the electronic device 101 of FIGS. 1, 2, 3, 4, 5, and 6A, 6B, 6C, and 6D. The first external electronic device 310 of FIG. 8 may correspond to the first external electronic device 310 of FIGS. 3, 4, and 5 and FIG. 7. The plurality of second external electronic devices 320-1, 320-4 of FIG. 8 may correspond to the plurality of second external electronic devices 320-1, 320-4 of FIG. 4. The operation of FIG. 8 may be related to at least one of the operations of FIG. 7, for example.

Referring to FIG. 8, the first external electronic device 310 may receive an image from the electronic device 101. For example, the first external electronic device 310 may receive the image from the electronic device 101 based on operation 710 of FIG. 7. In an embodiment, the image received from the electronic device 101 may be obtained from a camera module (for example, the camera module 180 of FIG. 1 or 2) of the electronic device 101. In an embodiment, the electronic device 101 may transmit the image to the first external electronic device 310 at the same time as outputting the image obtained from the camera module within the display 410. A format of the image received by the first external electronic device 310 may correspond to a format of a raw image.

Referring to FIG. 8, in response to the image being received from the electronic device 101, the first external electronic device 310 may identify a plurality of portions 515-1, 515-2 within the received image. For example, the first external electronic device 310 may identify the plurality of portions 515-1, 515-2 based on operation 720 of FIG. 7. In an embodiment, the plurality of portions 515-1, 515-2 may be related to at least a portion of an external object captured within the image. In an embodiment, the plurality of portions 515-1, 515-2 may be a portion of the image that may be processed by the plurality of second external electronic devices 320-1, 320-4 connected to the first external electronic device 310. In response to the plurality of portions 515-1, 515-2 being identified, for example, based on operation 730 of FIG. 7, the first external electronic device 310 may generate information regarding the result of identifying the plurality of portions 515-1, 515-2 or an external object included in the plurality of portions 515-1, 515-2. The generated information may be transmitted to the electronic device 101 as a result of recognizing the image (for example, the first information 312 of FIG. 3).

The first external electronic device 310 may identify second external electronic devices corresponding to the plurality of portions 515-1, 515-2, respectively, based on operation 740 of FIG. 7, for example. Referring to FIG. 8, the first external electronic device 310 may identify the second external electronic device 320-1 corresponding to the portion 515-1 in which characters are captured, from among the plurality of second external electronic devices 320-1, 320-4. The second external electronic device 320-1 may provide a service for recognizing characters included in an image. Referring to FIG. 8, the first external electronic device 310 may identify the second external electronic device 320-4 corresponding to the portion 515-2 from which a trademark is captured, from among the plurality of second external electronic devices 320-1, 320-4. The second external electronic device 320-4 may provide a search service based on a trademark included in an image (for example, a service for searching a product related to the trademark).

In response to the second external electronic devices corresponding to the plurality of portions 515-1, 515-2 being identified, the first external electronic device 310 may transmit a plurality of images 810, 820 related to the plurality of portions 515-1, 515-2 to the identified second external electronic devices 320-1, 320-4. The first external electronic device 310 may transmit the plurality of images 810, 820 to the second external electronic devices 320-1, 320-4 based on operation 750 of FIG. 7, for example. The plurality of images 810, 820 may be generated by extracting or cropping the plurality of portions 515-1, 515-2 within the image.

Referring to FIG. 8, the first external electronic device 310 may transmit the image 810 corresponding to the portion 515-1 in which the characters are captured to the second external electronic device 320-1 providing the service for character recognition. The first external electronic device 310 may transmit the image 820 corresponding to the portion 515-2 in which the trademark is captured to the second external electronic device 320-4 providing the search service related to the trademark.

The first external electronic device 310 may generate the plurality of images 810, 820 to be transmitted to the second external electronic devices 320-1, 320-4, respectively, based on the plurality of identified portions 515-1, 515-2. For example, the first external electronic device 310 may generate the plurality of images 810, 820 by performing image adjustment with respect to the plurality of portions 515-1, 515-2. The image adjustment may be performed based on a resolution, a size, or quality of an image required by each of the second external electronic devices 320-1, 320-4 which are to receive the plurality of images 810, 820.

For example, the second external electronic device 320-1 for recognizing characters may require an image of relatively high quality. The first external electronic device 310 may generate the image 810 to be transmitted to the second external electronic device 320-1, by reinforcing a resolution or quality of the portion 515-1 in which the characters are captured. For example, the first external electronic device 310 may generate the image 810 having quality required by the second external electronic device 320-1, by performing an operation related to sharpness, such as sharpening, with respect to the portion 515-1 in which the characters are captured.

For example, the second external electronic device 320-4 related to the trademark search service may require an image of relatively low quality. The first external electronic device 310 may generate the image 820 to be transmitted to the second external electronic device 320-4 by adjusting a resolution or quality of the portion 515-2 in which the trademark is captured. Although not shown, a second external electronic device providing a service based on a geographical position (for example, GPS coordinates) included in an image may require an image of relatively low quality.

Figure 9:
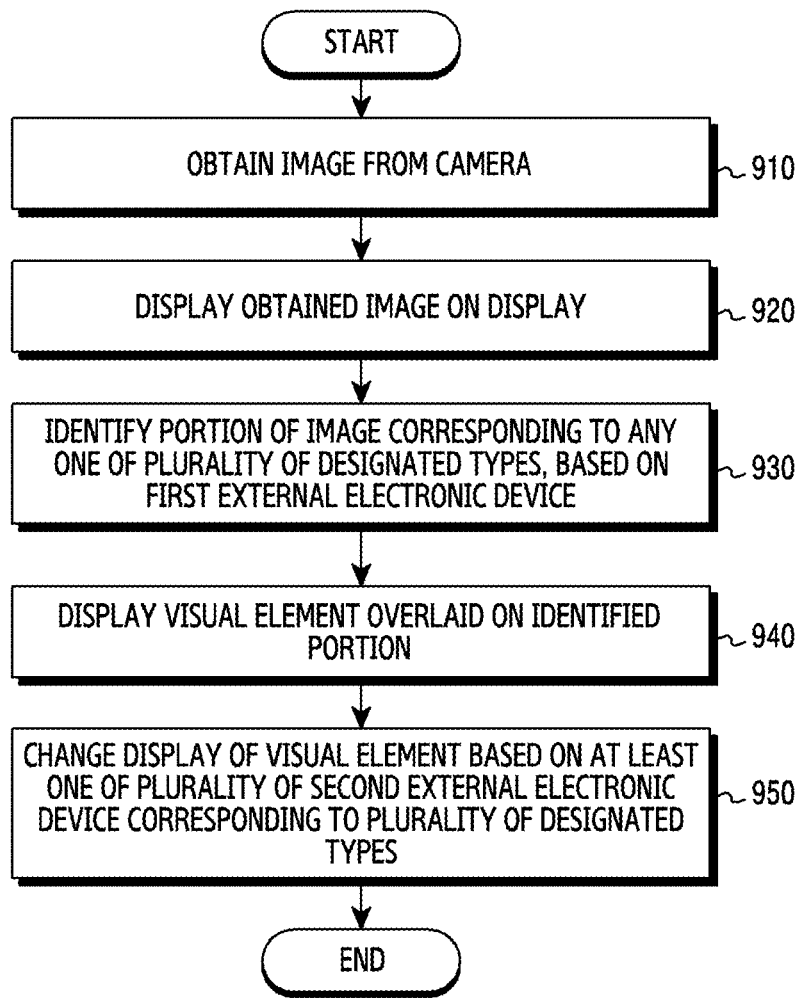
FIG. 9 illustrates a flowchart to explain operations of an electronic device according to various embodiments.

FIG. 9 illustrates a flowchart to explain operations of an electronic device according to various embodiments. The electronic device of FIG. 9 may correspond to the electronic device 101 of FIGS. 1, 2, 3, 4, 5, 6A, 6B, 6C, and 6D and FIG. 8. At least one of the operations of FIG. 9 may be performed by the processor 120 of the electronic device 101 of FIG. 4.

Referring to FIG. 9, in operation 910, the electronic device according to various embodiments may obtain an image from a camera. Referring to FIG. 9, in operation 920, the electronic device according to various embodiments may display the obtained image on a display. Operations 910, 920 of the electronic device may be performed based operation 510 of FIG. 5 described above.

Referring to FIG. 9, in operation 930, the electronic device according to various embodiments may identify a portion of the image corresponding to any one of a plurality of designated types, based on a first external electronic device. The first external electronic device may correspond to the first external electronic device 310 of FIGS. 3, 4, and 5. In an embodiment, while displaying the obtained image on the display, the electronic device may transmit the obtained image to the first external electronic device. The first external electronic device which receives the image may extract one or more portions from the image by performing image recognition based on operation 520 of FIG. 5. The first external electronic device may transmit, to the electronic device, information including at least one of a position of the extracted portion, a type of an external object existing in the portion, and conditions satisfied by the external object. Based on the information, the electronic device may identify the portion of the image corresponding to any one of the plurality of designated types.

Referring to FIG. 9, in operation 940, the electronic device according to various embodiments may display a visual element overlaid on the identified portion. Operation 940 may be performed based on operation 530 of FIG. 5 described above. One or more visual elements displayed in operation 940 may be outputted on the image displayed within the display of the electronic device as described in FIG. 6C.

For example, in response to the plurality of portions extracted within the image by the first external electronic device being identified, the electronic device may display a plurality of visual elements overlaid on the plurality of identified portions. The plurality of visual elements may have shapes distinct from one another according to types corresponding to the portions overlaid on the plurality of visual elements from among the plurality of designated types. The operation of the electronic device displaying the visual element overlaid on the portions identified based on the first external electronic device will be described in detail with reference to FIGS. 10A and 10B.

Referring to FIG. 9, in operation 950, the electronic device according to various embodiments may change the display of the visual element, based on at least one of the plurality of second external electronic devices corresponding to the plurality of designated types, respectively. The plurality of second external electronic devices may be distinguished from the first external electronic device and may correspond to the plurality of designated types, respectively. The plurality of second external electronic devices may be at least some of the plurality of second external electronic devices 320-1, 320-2, ..., 320-5 connected with the first external electronic device of FIG. 4.

For example, the first external electronic device may transmit the identified portions of the image to the plurality of second external electronic devices based on operation 705 of FIG. 7. The second external electronic device which receives the portion of the image may transmit data corresponding to the received portion to the electronic device. In an embodiment, the second external electronic device may transmit the data corresponding to the received portion to the first external electronic device. The first external electronic device which receives the data may transmit the received data to the electronic device. Based on the data received from the plurality of second external electronic devices, the electronic device may change the display of the visual element displayed in operation 940 or may further output a visual element corresponding to the data. The operation of the electronic device changing or adding the display of the visual element will be described in detail with reference to FIGS. 11A, 11B, 11C, and 11D.

Figure 10A:
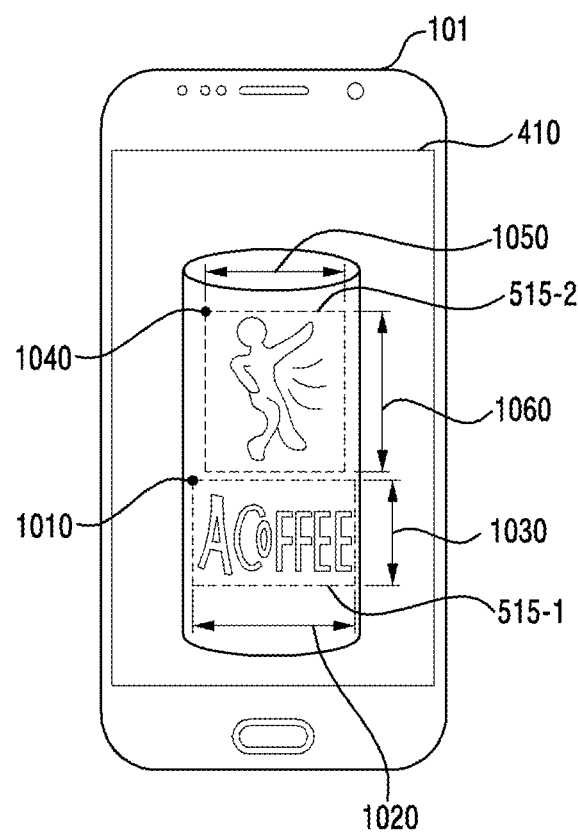
FIG. 10A illustrates a view to explain an operation of an electronic device obtaining information related to portions within an image according to various embodiments.
Figure 10B:
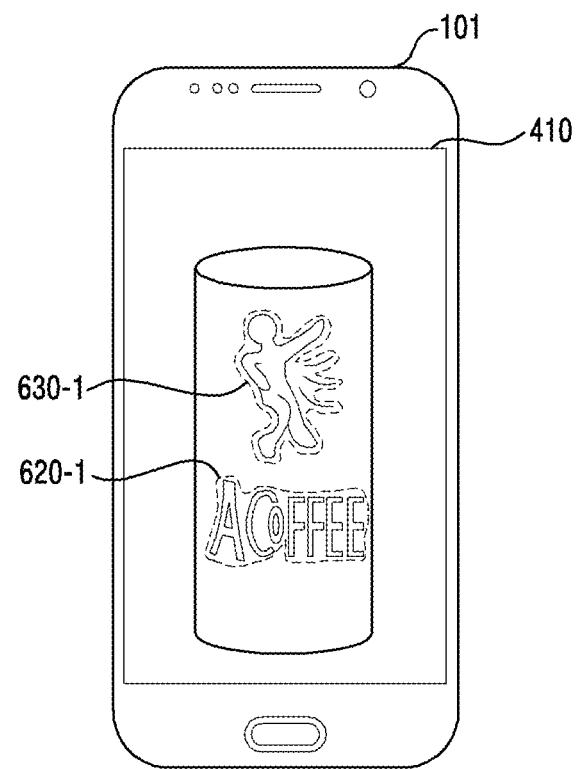
FIG. 10B illustrates a view to explain the operation of the electronic device obtaining the information related to the portions within the image according to various embodiments.

FIG. 10A is a view illustrating an operation of an electronic device 101 obtaining information related to portions 515-1, 515-2 within an image according to various embodiments, and FIG. 10B is a view illustrating the operation of the electronic device 101 obtaining the information related to the portions 515-1, 515-2 within the image according to various embodiments. The electronic device 101 of FIGS. 10A and 10B may correspond to the electronic device 101 of FIGS. 1, 2, 3, 4, 5, 6A, 6B, 6C, and 6D, and FIG. 8. The operation of the electronic device 101 of FIGS. 10A and 10B may be related to operations 910, 920, 930, 940 of FIG. 9.

Referring to FIG. 10A, the electronic device 101 may identify a plurality of portions 515-1, 515-2 within an image. For example, the electronic device 101 may identify the portion 515-1 including characters within the image and the portion 515-2 including a trademark, based on a first external electronic device. The first external electronic device may correspond to the first external electronic device 310 of FIGS. 3, 4, and 5. The first external electronic device may transmit information related to the plurality of portions 515-1, 515-2 to the electronic device 101. For example, the first external electronic device may transmit, to the electronic device 101 as information related to the portion 515-1, at least one of coordinates of a reference point 1010 of the portion 515-1 within the image, a width 1020 of the portion 515-1, a height 1030 of the portion 515-1, information related to an external object existing within the portion 515-1 (for example, a type of the external object (one or more characters), an outline of the external object), information related to a second external electronic device corresponding to the portion 515-1 (for example, the second external electronic device 320-1 for recognizing characters, shown in FIG. 4) or a condition satisfied by the portion 515-1.

Similarly, the first external electronic device may transmit, to the electronic device 101 as information related to the portion 515-2, at least one of coordinates of a reference point 1040 of the portion 515-2 within the image, a width 1050 of the portion 515-2, a height 1060 of the portion 515-2, information related to an external object existing within the portion 515-2 (for example, a type of the external object (trademark), an outline of the external object), information related to a second external electronic device corresponding to the portion 515-2 (for example, the second external electronic device 320-4 for recognizing a trademark as shown in FIG. 4) or a condition satisfied by the portion 515-2. The information related to the plurality of portions 515-1, 515-2 may correspond to recipe information transmitted from the first external electronic device to the electronic device 101.

Referring to FIG. 10B, in response to the plurality of portions 515-1, 515-2 being identified, the electronic device 101 may output visual elements 620-1, 630-1 corresponding to the plurality of portions 515-1, 515-2, respectively, within the display 410. Respective positions of the visual elements 620-1, 630-1 may correspond to positions of the plurality of portions 515-1, 515-2 displayed within the display 410. The visual elements 620-1, 630-1 may be overlaid on at least a portion of the image displayed within the display 410.

The electronic device 101 may simultaneously output the visual elements 620-1, 630-1 having different shapes, based on types of the external objects captured within the plurality of portions 515-1, 515-2. For example, the electronic device 101 may output the visual element 620-1 including an outline of one or more captured characters, based on the one or more characters captured within the portion 515-1. For example, the electronic device 101 may output the visual element 630-1 including an outline of a figure, a picture, or a trademark captured within the portion 515-2. Colors of the visual elements 620-1, 630-1 may be determined to be different from each other, based on the different types of objects captured within the portions 515-1, 515-2.

Figure 11A:
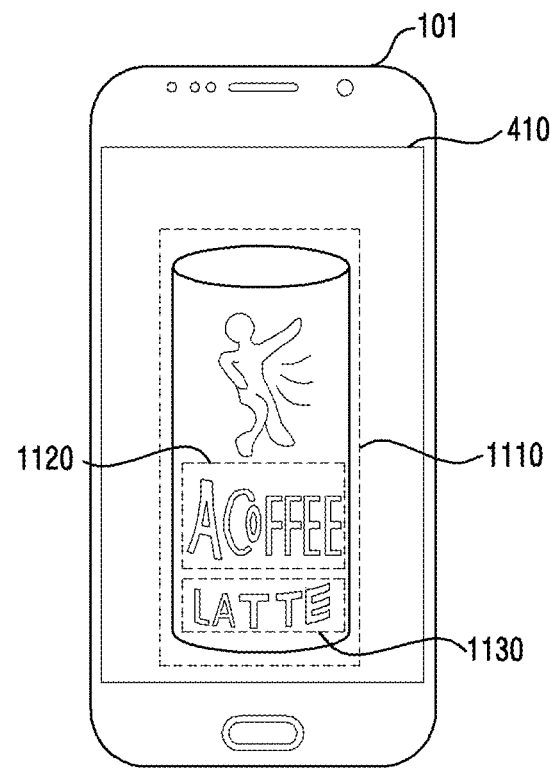
FIG. 11A illustrates a view to explain shapes of visual elements outputted on an image within a display by an electronic device according to various embodiments.
Figure 11B:
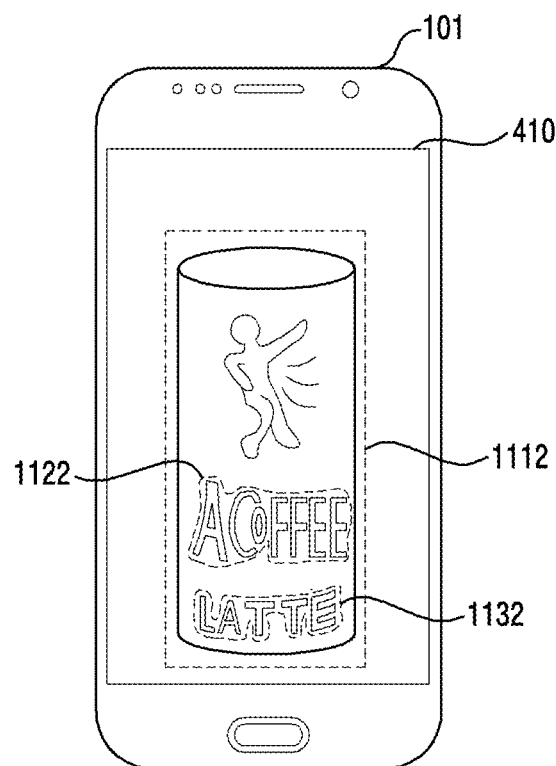
FIG. 11B illustrates a view to explain the shapes of the visual elements outputted on the image within the display by the electronic device according to various embodiments.
Figure 11C:
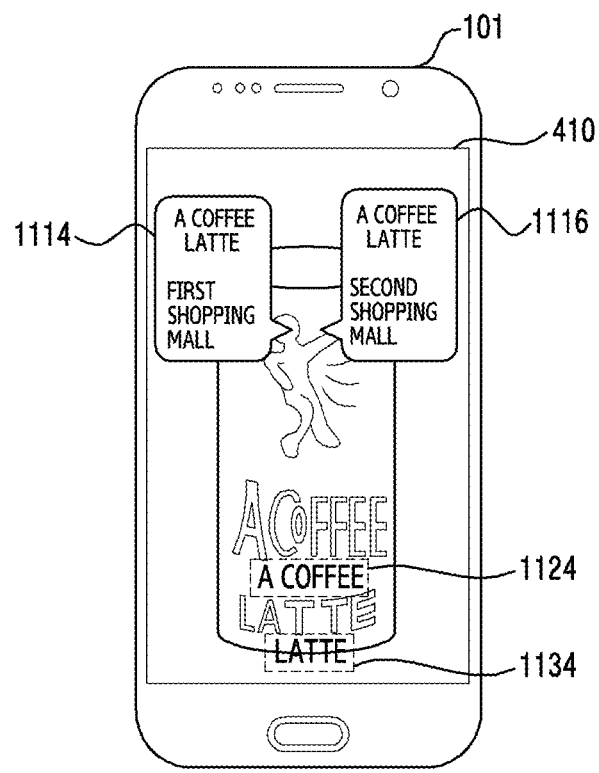
FIG. 11C illustrates a view to explain the shapes of the visual elements outputted on the image within the display by the electronic device according to various embodiments.
Figure 11D:
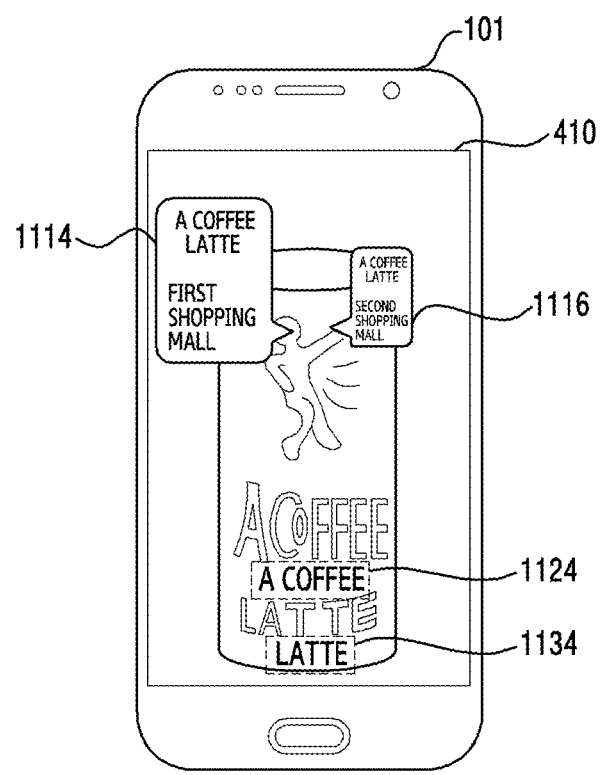
FIG. 11D illustrates a view to explain the shapes of the visual elements outputted on the image within the display by the electronic device according to various embodiments.

FIG. 11A illustrates a view to explain a shape of a visual element outputted on an image within a display 410 by an electronic device 101 according to various embodiments, FIG. 11B illustrates a view to explain a shape of a visual element outputted on the image within the display 410 by the electronic device 101 according to various embodiments, FIG. 11C illustrates a view to explain a shape of a visual element outputted on the image within the display 410 by the electronic device 101 according to various embodiments, and FIG. 11D illustrates a view to explain a shape of a visual element outputted on the image within the display 410 by the electronic device 101 according to various embodiments. The electronic device 101 of FIGS. 11A, 11B, 11C, and 11D may correspond to the electronic device 101 of FIGS. 1, 2, 3, 4, 5, 6A, 6B, 6C, and 6D, and FIG. 8. The operation of the electronic device 101 of FIGS. 11A, 11B, 11C, and 11D may be related to operation 950 of FIG. 9.

Referring to FIG. 11A, the electronic device 101 may identify a portion 1110 including a product and a plurality of portions 1120, 1130 including characters within an image, based on a first external electronic device. The plurality of portions 1110, 1120, 1130 identified within the image may be overlaid on one another at least in part. The first external electronic device may correspond to the first external electronic device 310 of FIGS. 3, 4, and 5. The first external electronic device may transmit information related to a result of identifying the plurality of portions 1110, 1120, 1130 to the electronic device 101.

Referring to FIG. 11B, based on the information transmitted by the first external electronic device, the electronic device 101 may output visual elements 1112, 1122, 1132 corresponding to the plurality of portions 1110, 1120, 1130, respectively, within the display 410. Positions of the visual elements 1112, 1122, 1132 may correspond to positions of the plurality of portions 1110, 1120, 1130 on the image displayed within the display 410.

Respective shapes or colors of the visual elements 1112, 1122, 1132 may be related to types of external objects existing in the plurality of portions 1110, 1120, 1130. For example, the shape of the visual element 1112 corresponding to the portion 1110 including the product may be an outline of a group of pixels related to the product within the image, or a figure (for example, a polygon such as a rectangle) wrapping the group. For example, the shapes of the visual elements 1122, 1132 corresponding to the plurality of portions 1120, 1130 including characters may correspond to outlines of the one or more characters included in the plurality of portions 1120, 1130.

The first external electronic device may segment the plurality of portions 1110, 11230, 1130 within the image, and then may transmit the plurality of segmented portions 1110, 1120, 1130 to at least one of a plurality of second external electronic devices connected with the first external electronic device. The plurality of second external electronic devices may correspond to the plurality of second external electronic devices 320-1, 320-2, . . . , 320-5 of FIG. 4. For example, the portion 1110 including the product may be transmitted to a second external electronic device performing search based on a product (for example, the second external electronic device 320-3 of FIG. 4). For example, the first external electronic device may transmit the plurality of portions 1120, 1130 including the characters to a second external electronic device for recognizing characters (for example, the second external electronic device 320-1 of FIG. 4). When transmitting the portions 1110, 1120, 1130 to at least one of the plurality of second external electronic devices, the first external electronic device may adjust the portions 1110, 1120, 1130 to be transmitted based on the second external electronic device, based on description of FIG. 8.

The second external electronic device receiving the portion 1110 may access one or more product shopping services (for example, a plurality of shopping mall sites) based on the product included in the portion 1110. The second external electronic device may classify results of accessing the product shopping service by each of the accessed product shopping services, and may transmit the results to the electronic device 101.

The second external electronic device receiving the portions 1120, 1130 may identify one or more characters captured on the portions 1120, 1130, and may generate text data corresponding to the portions 1120, 1130, respectively. The second external electronic device may transmit the generated text data to the electronic device 101.

Referring to FIG. 11C, in response to the plurality of data corresponding to the plurality of portions 1110, 1120, 1130 being received from the second external electronic devices, the electronic device 101 may output the plurality of data received from the plurality of second electronic devices within the display 410 altogether. Referring to FIG. 11C, the electronic device 101 may output visual elements 1124, 1134 corresponding to the portions 1120, 1130 including the characters, based on the data received from the second external electronic devices. As the visual elements 1124, 1134 are outputted, the display of the visual elements 1122, 1132 displayed on the portions 1120, 1130 based on the first external electronic device may be changed or removed.

Referring to FIG. 11C, the electronic device 101 may output visual elements 1114, 1116 corresponding to the portion 1110 including the product, based on the data received from the second external electronic devices. The visual elements 1114, 1116 may include result of searching based on the product captured within the portion 1110 within different product shopping services. The visual elements 1114, 1116 may include identifiers of the product shopping services used to obtain the results included in the visual elements (for example, a first shopping mall, a second shopping mall). The results may be related to the product captured within the portion 1110, and may include a list of at least one product obtained from the product shopping services. At least one of shapes or colors of the visual elements 1114, 1116 may be related to the corresponding product shopping services.

The electronic device 101 may highlight a service relatively frequently used by the user or a visual element related to the service from among the plurality of visual elements 1114, 1116, 1124, 1134. For example, when the user relatively frequently uses the service for recognizing characters included in an image, the electronic device 101 may highlight the visual elements 1124, 1134 related to recognition of characters, rather than the visual elements 1114, 1116 related to search of the product, and may display the visual elements. For example, the electronic device 101 may make the sizes of the visual elements 1124, 1134 larger than the sizes of the visual elements 1114, 1116, or may make the colors of the visual elements 1124, 1134 different from the colors of the visual elements 1114, 1116.

In various embodiments, the shapes, size, or colors of the visual elements 1114, 1116, 1124, 1134 may be determined to be different from one another based on the services corresponding to the visual elements 1114, 1116, 1124, 1134 or types of the second external electronic devices, or priorities of the services. The priority may be determined based on a user's input or user's history information.

For example, referring to FIG. 11D, when the user uses the first shopping mall relatively more frequently than the second shopping mall, the electronic device 101 may display the size of the visual element 1114 related to the first shopping mall larger than the size of the visual element 1116 related to the second shopping mall. In an embodiment, the electronic device 101 may determine transparency of the visual element 1116 to be higher than transparency of the visual element 1114. In an embodiment, the electronic device 101 may change the color of the visual element 1114 to be highlighted more than the other visual elements 1116, 1124, 1134.

Referring to FIG. 11D, the visual elements 1114, 1116, 1124, 1134 that the electronic device 101 outputs based on the data obtained from the second external electronic devices may display information corresponding to the plurality of portions 1110, 1120, 1130 within the image, and also, may induce interaction with the user based on the plurality of portions 1110, 1120, 1130.

Figure 12:
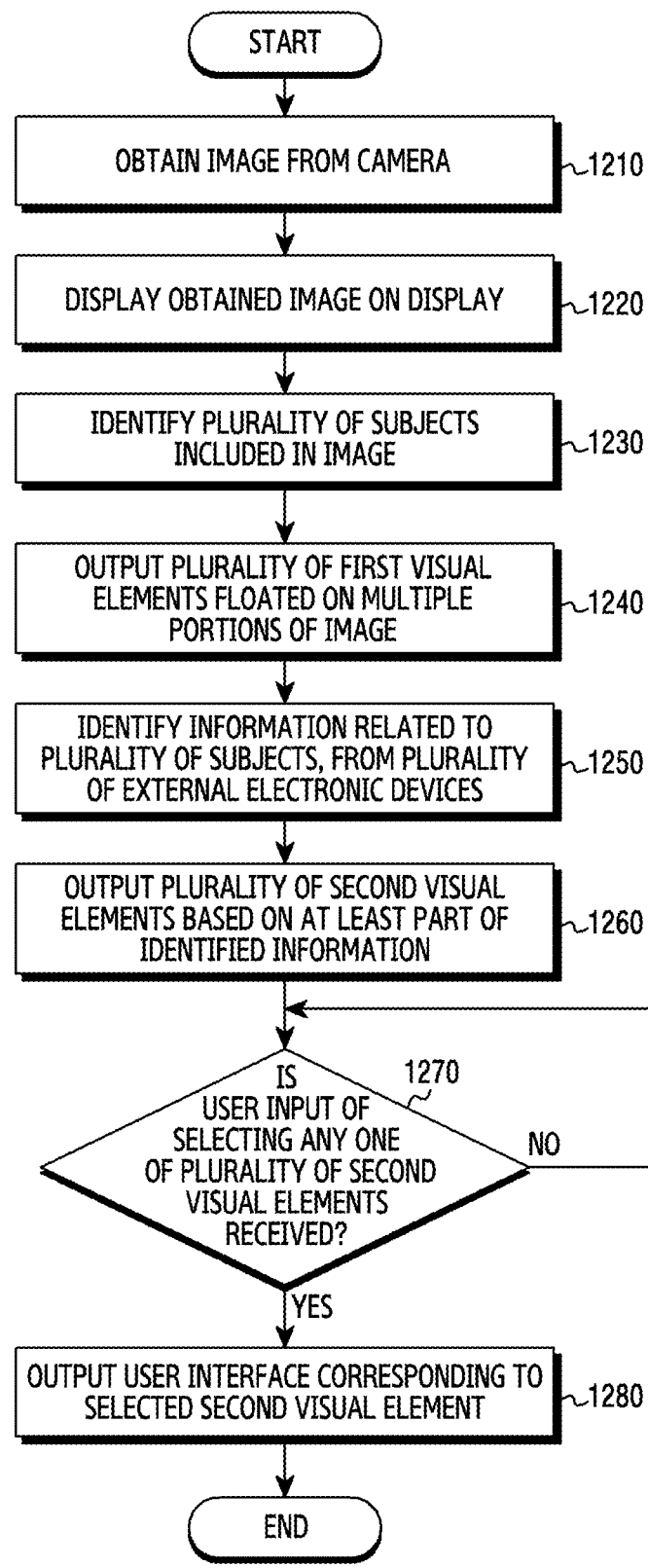
FIG. 12 illustrates a flowchart to explain operations of an electronic device according to an embodiment.

FIG. 12 illustrates a flowchart 200 to explain operations of an electronic device according to various embodiments. The electronic device of FIG. 12 may correspond to the electronic device 101 of FIGS. 1, 2, 3, 4, 5, 6A, 6B, 6C, and 6D, FIG. 8, and FIGS. 10A, 10B, 11A, 11B, 11C, and 11D. At least one of the operations of FIG. 12 may be related to the operations of FIG. 9.

Referring to FIG. 12, in operation 1210, the electronic device according to an embodiment may obtain an image from a camera. In operation 1220, the electronic device according to an embodiment may display the obtained image on the display. In operation 1230, the electronic device according to an embodiment may identify a plurality of subjects included in the image. Operations 1210, 1220, 1230 may be performed with reference to operations 910, 920, 930 of FIG. 9 described above.

Referring to FIG. 12, in response to the plurality of subjects being identified, the electronic device according to an embodiment may output a plurality of first visual elements floated on a plurality of portions of the displayed image in operation 1240. Respective shapes of the plurality of first visual elements may vary according to types of external objects or subjects captured on the plurality of portions, or second external electronic devices corresponding to the plurality of portions, respectively. In an embodiment, the respective shapes of the plurality of first visual elements may correspond to outlines of external objects or subjects captured on the plurality of portions. Operation 1240 may be performed with reference to operation 940 of FIG. 9 described above. The plurality of first visual elements may correspond to the visual elements 1112, 1122, 1132 of FIG. 11B, for example.

Referring to FIG. 12, in operation 1250, the electronic device according to an embodiment may identify information related to the plurality of subjects from a plurality of second external electronic devices. The plurality of second external electronic devices may correspond to the plurality of subjects, respectively. While outputting the plurality of first visual elements based on operation 1240, the electronic device may identify information related to the plurality of subjects from the plurality of second external electronic devices corresponding to the plurality of subjects. The information may be related to services provided by the second electronic devices (for example, a character recognition service, a product search service, an image search service, a trademark recognition service, a place information providing service).

Referring to FIG. 12, in operation 1260, in response to the information related to the plurality of subjects being identified, the electronic device according to an embodiment may output a plurality of second visual elements based on at least part of the identified information. The second visual elements may correspond to, for example, the visual elements 1114, 1116, 1124, 1134 of FIGS. 11C and 11D. The second visual elements may be floated on the image outputted within the display of the electronic device. The second visual elements may be overlaid on the plurality of portions at least in part. The electronic device may output the plurality of second visual elements based on identifiers of the plurality of second external electronic devices and at least part of the identified information.

Referring to FIG. 12, in operation 1270, the electronic device according to an embodiment may determine whether a user input of selecting any one of the plurality of second visual elements is received. The user input may include an operation of touching or clicking any one of the second visual elements.

In response to the user input of selecting any one of the plurality of outputted second visual elements being identified, the electronic device according to an embodiment may output a UI corresponding to the selected second visual element in operation 1280. For example, in response to the user input being identified, the electronic device may identify an external electronic device related to the selected second visual element from among the plurality of second external electronic devices. In response to the external electronic device related to the selected second visual element being identified, the electronic device may output a UI corresponding to the identified external electronic device on at least part of the display. The operation of the electronic device outputting the UI related to the second visual element based on the user input will be described in more detail with reference to FIGS. 14A and 14B.

Figure 13A:
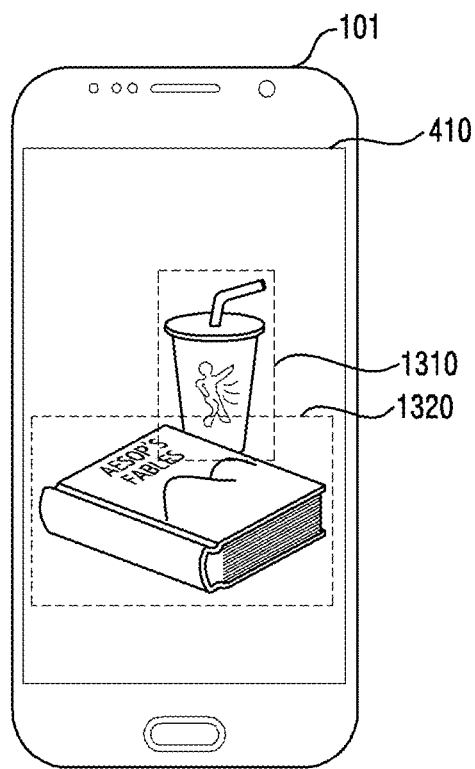
FIG. 13A illustrates a view to explain an operation of an electronic device recognizing a plurality of subjects within an image according to an embodiment.
Figure 13B:
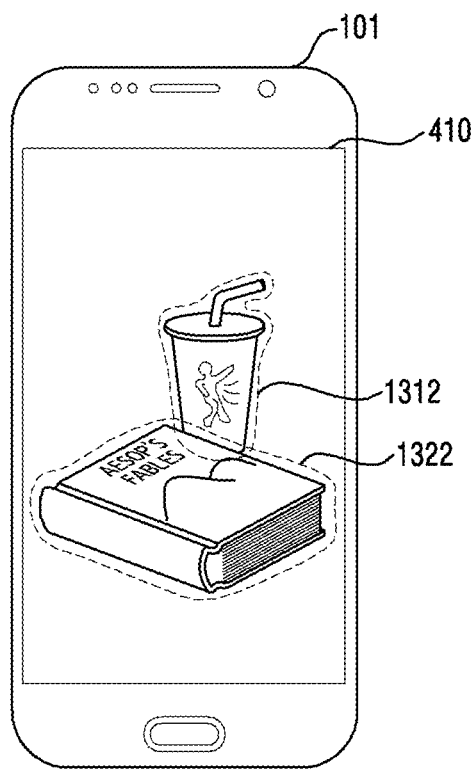
FIG. 13B illustrates a view to explain the operation of the electronic device recognizing the plurality of subjects within the image according to an embodiment.
Figure 13C:
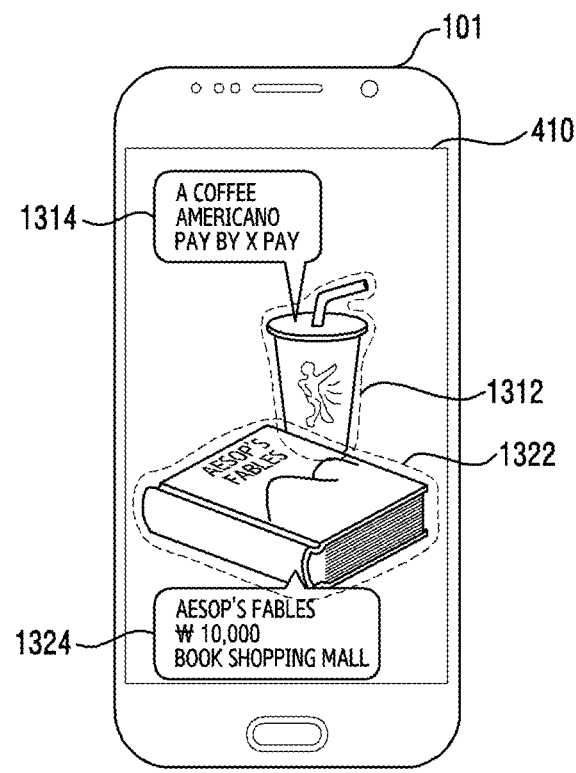
FIG. 13C illustrates a view to explain the operation of the electronic device recognizing the plurality of subjects within the image according to an embodiment.

FIG. 13A is a view illustrating an operation of an electronic device 101 recognizing a plurality of subjects 1310, 1320 within an image according to an embodiment, FIG. 13B is a view illustrating the operation of the electronic device 101 recognizing the plurality of subjects 1310, 1320 within the image according to an embodiment, and FIG. 13C is a view illustrating the operation of the electronic device 101 recognizing the plurality of subjects 1310, 1320 within the image according to an embodiment. The electronic device 101 of FIGS. 13A, 13B, and 13C may correspond to the electronic device 101 of FIGS. 1, 2, 3, 4, 5, 6A, 6B, 6C, and 6D, and FIG. 8. The operation of the electronic device 101 of FIGS. 13A, 13B, and 13C may be related to operations of FIG. 9 or 12.

Referring to FIG. 13A, a user of the electronic device 101 may move an image sensor of the electronic device 101 toward the plurality of subjects 1310, 1320. In response to an image including the plurality of subjects 1310, 1320 being obtained from the image sensor, the electronic device 101 may transmit the obtained image to a first external electronic device. The first external electronic device may identify the plurality of subjects 1310, 1320 included in the image, based on image recognition. Identifying a subject refers to identifying at least one of a position of the subject within an image, a type of the subject, or a type of a service provided based on the subject. The first external electronic device may transmit data indicating a result of identifying the plurality of subjects 1310, 1320 to the electronic device 101.

Referring to FIG. 13B, in response to the data indicating the result of identifying the plurality of subjects 1310, 1320 being received, the electronic device 101 may output a plurality of visual elements 1312, 1322 corresponding to the plurality of subjects 1310, 1320, respectively, within the display 410. The plurality of visual elements 1312, 1322 may correspond to the first visual elements of FIG. 12.

Respective positions of the plurality of visual elements 1312, 1322 within the display 410 may correspond to respective positions of the plurality of subjects 1310, 1320 within the image displayed within the display 410. Shapes of the plurality of visual elements 1312, 1322 may be based on outlines of the plurality of subjects 1310, 1320. For example, since the subject 1310 is a beverage cup, the electronic device 101 may determine the shape of the visual element 1312 based on the beverage cup. For example, since the subject 1320 is a book, the electronic device 101 may determine the shape of the visual element 1322 based on the book.

In response to the plurality of subjects 1310, 1320 being identified, the first external electronic device may transmit portions of the image including the plurality of subjects 1310, 1320, respectively, to a plurality of second external electronic devices corresponding to a plurality of services related to the plurality of subjects 1310, 1320. The plurality of second external electronic devices may be at least one of the second external electronic devices 320-1, 320-2, . . . , 320-5 of FIG. 4, for example. The second external electronic device receiving the portions of the image may transmit data corresponding to the portions of the image to the electronic device 101.

For example, the first external electronic device may transmit a portion of the image including the subject 1310 to a second external electronic device which processes an order for a beverage. The second external electronic device receiving the portion of the image including the subject 1310 may transmit information for ordering a beverage related to the subject 1310 to the electronic device 101. For example, the first external electronic device may transmit a portion of the image including the subject 1320 to a second external electronic device related to an online order for a book. The second external electronic device receiving the portion of the image including the subject 1320 may transmit a list of books related to the subject 1320 to the electronic device 101.

Referring to FIG. 13C, in response to the data received from the plurality of second external electronic devices, the electronic device 101 may output a plurality of visual elements 1314, 1324 corresponding to the data received from the plurality of second external electronic devices within the display 410. The plurality of visual elements 1314, 1324 may correspond to the second visual elements of FIG. 12. The visual element 1314 corresponding to the subject 1310 may include data related to an order for a beverage. The visual element 1324 corresponding to the subject 1320 may include a result of searching books. The user may input a command related to any one of the plurality of services or the plurality of second external electronic devices corresponding to the plurality of visual elements 1314, 1324 by performing a gesture related to any one of the plurality of visual elements 1314, 1324. The gesture may include a touch or a click of a visual element.

Figure 14A:
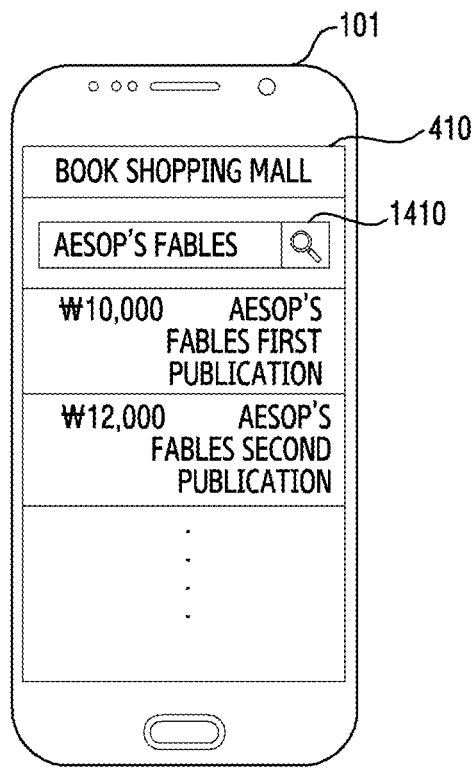
FIG. 14A illustrates a view to explain an operation performed by an electronic device in response to a user input related to at least one of visual elements according to an embodiment of FIG. 13C.
Figure 14B:
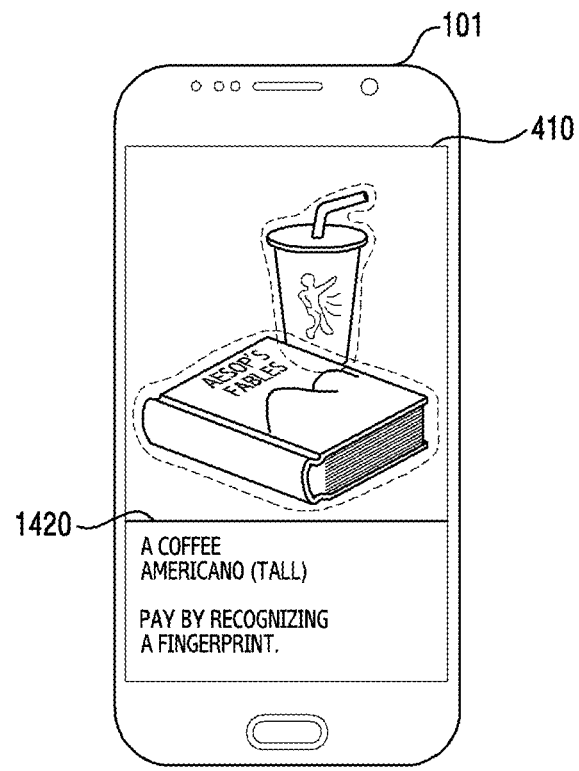
FIG. 14B illustrates a view to explain the operation performed by the electronic device in response to a user input related to at least one of the visual elements according to an embodiment of FIG. 13C.

FIG. 14A is a view illustrating an operation performed by an electronic device 101 in response to a user input related to at least one of the visual elements 1314, 1324 according to the embodiment of FIG. 13C, and FIG. 14B is a view illustrating an operation performed by the electronic device 101 in response to a user input related to at least one of the visual elements 1314, 1324 according to the embodiment of FIG. 13C. The electronic device 101 of FIGS. 14A and 14B may correspond to the electronic device 101 of FIGS. 13A, 13B, and 13C.

When the user selects the visual element 1324 corresponding to the subject 1320 of FIG. 13C, the electronic device 101 according to an embodiment may output a UI based on FIG. 14A. The UI of FIG. 14A may be outputted based on an application corresponding to the second external electronic device related to the subject 1320 from among a plurality of applications installed in a memory of the electronic device 101. Referring to FIG. 14A, information related to the subject 1320 may be inputted into a search field 1410 of the UI.

When the user selects the visual element 1314 corresponding to the subject 1310 of FIG. 13C, the electronic device 101 according to an embodiment may output a UI 1420 based on FIG. 14B on at least part of the display 410. The UI 1420 may be to receive a confirmation on the order for the product (for example, a beverage) related to the subject 1310 of FIG. 13 from the user. Referring to FIG. 14B, the UI 1420 may further include a visual element (for example, "Pay by recognizing a fingerprint.") for inputting additional information for ordering the product (for example, a user's fingerprint, an iris image, biometric information such as a voice or certificate, a password, a one time password (OTP), a PIN number).

Figure 15:
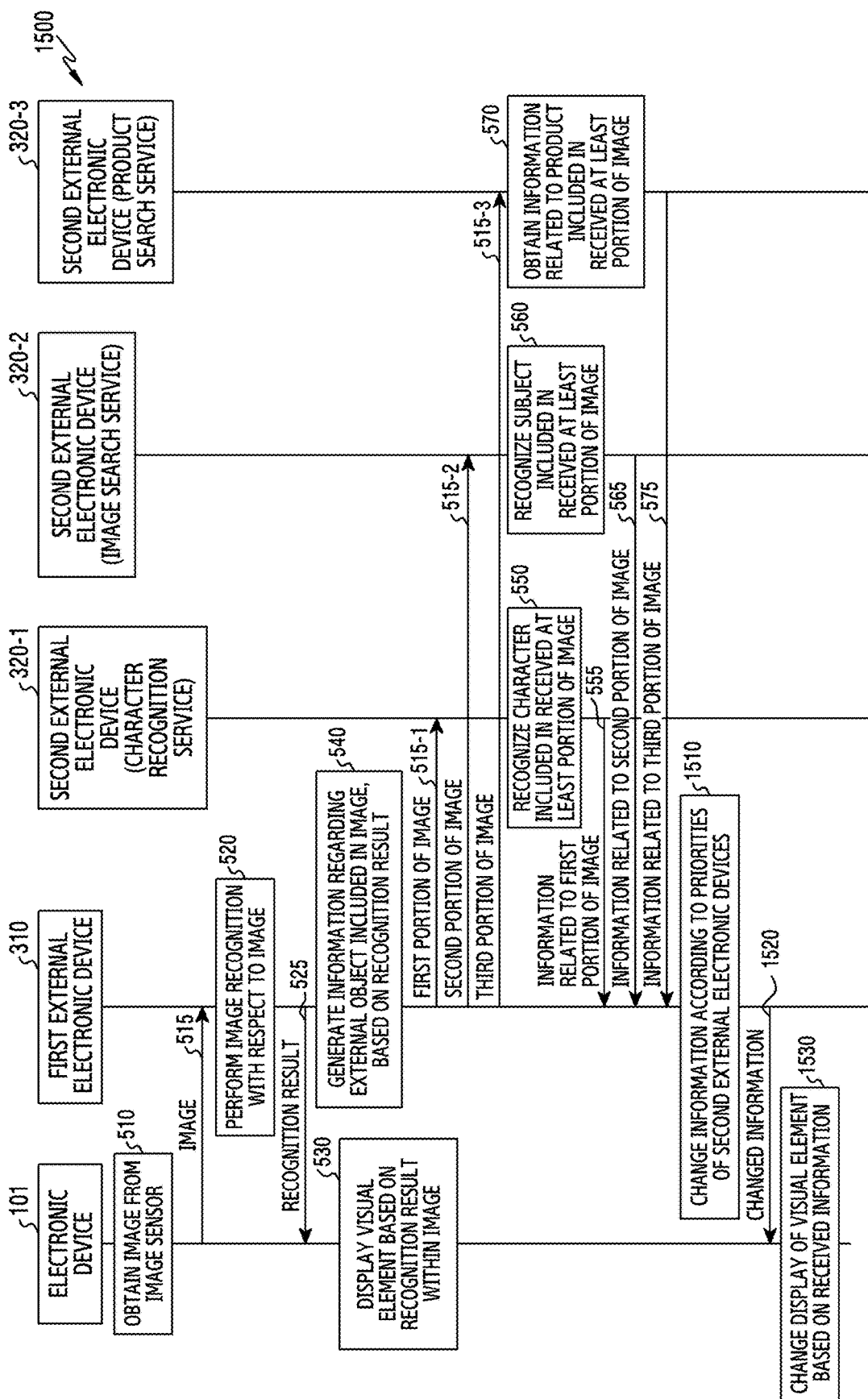
FIG. 15 illustrates a signal flowchart to explain operations performed by an electronic device, a first external electronic device, and second external electronic devices according to an embodiment.

FIG. 15 is a signal flowchart 1500 to explain operations performed by an electronic device 101, a first external electronic device 310, and second external electronic devices 320-1, 320-2, 320-3 according to an embodiment. The electronic device 101 of FIG. 15 may correspond to the electronic device 101 of FIGS. 3 and 4. The first external electronic device 310 of FIG. 15 may correspond to the first external electronic device 101 of FIGS. 3 and 4. The second external electronic devices 320-1, 320-2, 320-3 of FIG. 15 may correspond to the second external electronic devices 320-1, 320-2, 320-3 of FIG. 4, respectively. At least some of the operations of FIG. 15 may be performed based at least some of the operations of FIG. 5. The same operations of FIG. 15 as those of FIG. 5 will not be described.

Referring to FIG. 15, in operation 540, the first external electronic device 310 according to an embodiment may transmit the first portion 515-1 and the second portion 515-2 obtained from the electronic device 101 to the plurality of second external electronic devices 320-1, 320-2, 320-3. The first external electronic device 310 may request the plurality of second external electronic devices 320-1, 320-2, 320-3 to transmit information related to the first portion 515-1 and the second portion 515-2 to the first external electronic device 310.

The plurality of second external electronic devices 320-1, 320-2, 320-3 receiving the portions of the image may perform operations 550, 560, 570 based on the received portions. The plurality of second external electronic devices 320-1, 320-2, 320-3 may transmit a plurality of pieces of information 555, 565, 575 corresponding to the portions of the image to the first external electronic device 310. For example, the information 555 may include text data which is generated by the second external electronic device 320-1 related to the character recognition service by recognizing characters included in the received first portion 515-1 of the image. The information 565 may include a result of searching, by the second external electronic device 320-2 related to the image recognition service, a web based on an image of a subject included in the received second portion 515-2 of the image. The information 575 may include a result of searching, by the second external electronic device 320-3 related to the product search service, a product similar to the subject included in the received second portion 515-2 of the image.

In response to the plurality of pieces of information 555, 565, 575 being received, the first external electronic device 310 according to an embodiment may change or align the plurality of pieces of information 555, 565, 575 based on priorities of the plurality of second external electronic devices 320-1, 320-2, 320-3 corresponding to the plurality of pieces of information 555, 565, 575 in operation 1510. For example, the first external electronic device 310 may transmit the plurality of pieces of information 555, 565, 575 to the electronic device 101 in sequence based on an order based on the priorities. For example, the first external electronic device 310 may change at least one of the plurality of pieces of information 555, 565, 575, based on the priorities.

Referring to FIG. 15, information 1502 transmitted from the first external electronic device 310 to the electronic device 101 may include the plurality of pieces of information 555, 565, 575 changed or aligned based on operation 1510. In response to the information 1520 being received, the electronic device 101 according to an embodiment may change display of visual elements based on the information

1520, or may output a visual element corresponding to the information 1520 in operation 1530. The electronic device 101 may output not only information included in the plurality of pieces of information 555, 565, 575, but also visual elements related to the plurality of pieces of information 555, 565, 575 based on the priorities. For example, the electronic device 101 may change at least one of shapes, sizes, or colors of the visual elements related to the plurality of pieces of information 555, 565, 575 based on the priorities.

According to various embodiments, based on interaction among the electronic device 101, the first external electronic device 310, and the plurality of second external electronic devices 320-1, 320-2, 320-3, the user can obtain information related to the plurality of services based on one image simultaneously. Even when the user does not select any one of the plurality of services, at least one service related to the image can be identified from the plurality of services. Identification of the service may be performed by the first external electronic device 310 connected with the electronic device 101. The first external electronic device 310 may select at least one service related to the image from among the plurality of services by identifying one or more external objects within the image received form the electronic device 101.

The plurality of services may be provided by the plurality of second external electronic devices 320-1, 320-2, 320-3, respectively, connected with the first external electronic device 310. The first external electronic device 310 may transmit at least portion of the image including the identified external object to the second external electronic device corresponding to the selected service. The at least portion of the image that the first external electronic device 310 transmits to the second external electronic device may be a portion that is changed or adjusted based on at least one of a resolution or quality required in the second external electronic device. In response to the at least portion of the image being received, the second external electronic device may obtain information corresponding to the received portion. The information may be related to the service provided by the second external electronic device.

When a plurality of external objects are included in an image and the plurality of external objects are related to a plurality of different services or a plurality of different second external electronic devices, the electronic device 101 may receive information corresponding to the plurality of external objects, respectively, from the plurality of second external electronic devices. The electronic device 101 may output the information corresponding to the plurality of external objects within the display simultaneously. The information may be overlaid on respective positions of the plurality of external objects within the image displayed within the display, or may be outputted in the form of an adjacent visual element. When the user selects a visual element, the electronic device 101 may output a service corresponding to the visual element or a UI based on the second external electronic device.

The electronic device and the method thereof according to various embodiments may not require a user to select at least one of a plurality of services when providing a service based on an external object included in an image. For example, the electronic device and the method thereof according to various embodiments may automatically select a service to be provided to the user from among a plurality of services, based on the external object.

The effects achieved by the disclosure are not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

Although the present disclosure has been described with various embodiments, various changes and modifications may be suggested to one skilled in the art. It is intended that the present disclosure encompass such changes and modifications as fall within the scope of the appended claims.

What is claimed is:

1. A server comprising:
    a communication circuit;
    a memory; and
    a processor,
    wherein the processor is configured to:
    receive a first image from a first external electronic device by using the communication circuit, wherein the first image is a raw image obtained from an image sensor of the first external electronic device;
    perform image recognition with respect to the first image by using the first image;
    based on the image recognition, identify at least one object included in the first image;

generate classification information regarding at least one object included in the first image, based on a result of the image recognition;

based on the classification information regarding the at least one object satisfying a first designated condition, transmit a first query including image data corresponding to a first portion of the first image and an identifier of the first external electronic device to a first external server, wherein the first portion corresponds to the first designated condition, wherein first service information corresponding to the first portion of the first image and a service of the first external server is generated by the first external server, and wherein the first service information is transmitted from the first external server to the first external electronic device based on the identifier of the first external electronic device; and based on the classification information regarding the at least one object satisfying a second designated condition, transmit a first query including image data corresponding to a second portion of the first image and the identifier of the first external electronic device to a second external server, the second portion corresponding to the second designated condition, wherein second service information corresponding to the second portion of the first image and a service of the second external server is generated by the second external server, and wherein the second service information is transmitted from the second external server to the first external electronic device based on the identifier of the first external electronic device, wherein each of the first portion and the second portion of the first image is less than an entirety of the first image, and wherein the first service information and the second service information are displayed with the first image on a display of the first external electronic device.

2. The server of claim 1, wherein the processor is configured to further transmit information regarding the first external electronic device to the first external server or the second external server, according to transmission of the first portion of the first image to the first external server or the second portion of the first image to the second external server.

3. The server of claim 2, wherein the information regarding the first external electronic device comprises at least network information corresponding to the first external electronic device, the network information being for transmitting, by the first external server or the second external server, the first service information or the second service information respectively generated by using the first or second portion of the first image to the first external electronic device.

4. The server of claim 1, wherein the processor is further configured to, based on the classification information regarding the at least one object satisfying the first designated condition or the second designated condition, transmit, to the first external electronic device through the communication circuit, a signal comprising a position of the at least one object within the first image and information related to the first designated condition and the second designated condition.

5. The server of claim 1, wherein the processor is further configured to:

identify an existence of a text included in the object, based on the classification information regarding the at least one object;

in response to identifying the existence of the text included in the at least one object, determine that the classification information regarding the object satisfies the first designated condition; and in response to the classification information regarding the at least one object satisfying the first designated condition, transmit a portion of the first image in which the text included in the object is captured as the first portion of the first image to the first external server which is configured to recognize the text.

6. The server of claim 5, wherein the processor is further configured to perform at least one of edge enhancement or sharpening with respect to the first portion of the first image to be transmitted to the first external server.

7. The server of claim 1, wherein the processor is further configured to:

based at least one the result of the image recognition, generate adjustment information corresponding to the first image; and transmit the adjustment information to the first external electronic device in order for the first external electronic device to adjust one or more of the first image or a second image corresponding to the first image by using at least the adjustment information.

8. An electronic device comprising:

an image sensor;

a display;

a communication circuit configured to communicate with a first external electronic device and a plurality of external servers which are distinct from the first external electronic device;

a memory configured to store a plurality of instructions; and at least one processor operably coupled to the image sensor, the display, the communication circuit, and the memory, wherein, when being executed, the plurality of instructions cause the at least one processor to:

obtain a raw image from the image sensor;

in response to the raw image being obtained, display an image based on the obtained raw image on the display;

transmit the raw image to the first external electronic device via the communication circuit;

receive, from the first external electronic device, classification information identifying multiple portions corresponding to a plurality of designated types within the raw image, respectively, wherein the multiple portions include a first portion of the raw image and a second portion of the raw image, and each of the first portion and the second portion of the raw image is less than an entirety of the raw image;

in response to the multiple portions being identified, display a plurality of visual elements overlaid on the multiple portions within the displayed image, the plurality of visual elements including shapes distinct from one another according to types corresponding to the portions, which are overlaid with the plurality of visual elements, from among the plurality of designated types; and receive, from the plurality of external servers which correspond to the plurality of designated types, respectively, recognition information corresponding to the identified multiple portions, wherein the plurality of external servers include a first external server and a second external server, the recognition information includes a first recognition information and a second recognition information, the first recognition information is transmitted from the first external server to the electronic device based on an identifier of the electronic device that the first external electronic device transmitted to the first external server, and the second recognition information is transmitted from the second external server to the electronic device based on the identifier of the electronic device that the first external electronic device transmitted to the second external server; and based on the received recognition information, change display of the plurality of visual elements.

9. The electronic device of claim 8, wherein, when being executed, the plurality of instructions further cause the at least one processor to:

in response to a first portion corresponding to a first type related to a character string from among the plurality of designated types being identified from among the identified multiple portions, display a first visual element corresponding to the first portion within the image, the first visual element comprising one or more outlines corresponding to one or more characters within the first portion;

based on the received recognition information from the first external server corresponding to the first type from among the plurality of external servers, identify a text message corresponding to the one or more characters; and based on the identified text message, change a display of the first visual element comprising the one or more outlines.

10. The electronic device of claim 8, wherein, when being executed, the plurality of instructions further cause the at least one processor to:

in response to a second portion corresponding to a second type related to a subject from among the plurality of designated types being identified from among the identified multiple portions, display a second visual element corresponding to the second portion within the image, the second visual element comprising one or more outlines corresponding to a shape of the subject within the second portion;

based on the received recognition information from the second external server corresponding to the second type from among the plurality of external servers, identify a result of recognizing the subject; and based on the identified result, change a display of the second visual element comprising the one or more outlines.

11. The electronic device of claim 8, wherein, when being executed, the plurality of instructions further cause the at least one processor to:

in response to a third portion corresponding to a third type related to a trademark from among the plurality of designated types being identified from among the identified multiple portions, display a third visual element corresponding to the third portion within the image, the third visual element comprising one or more outlines corresponding to a shape of the trademark within the third portion;

based on the received recognition information from a third external server corresponding to the third type from among the plurality of external servers, identify a result of searching at least one product corresponding to the trademark; and based on the identified result, display a list of the at least one product based on a position of the third visual element within the image.

12. The electronic device of claim 8, wherein, when being executed, the plurality of instructions further cause the at least one processor to display the plurality of visual elements based on colors corresponding to the plurality of designated types.

13. The electronic device of claim 8, wherein, when being executed, the plurality of instructions further cause the at least one processor to:

based on at least one of the first external electronic device or a user of the electronic device, identify respective priorities of the plurality of designated types; and in response to the priorities being identified, change the display of the plurality of visual elements.

14. The electronic device of claim 13, wherein, when being executed, the plurality of instructions further cause the at least one processor to adjust at least one of an order in which the plurality of visual elements are overlaid on the image, respective transparencies of the plurality of visual elements, or respective sizes of the plurality of visual elements, in response to the priorities being identified.

15. An electronic device comprising:

an image sensor;

a display;

a communication circuit configured to communicate with a first external electronic device and a plurality of external servers which are distinct from the first external electronic device;

a memory configured to store a plurality of instructions; and at least one processor operably coupled to the image sensor, the display, the communication circuit, and the memory, wherein, when being executed, the plurality of instructions cause the at least one processor to:

obtain a raw image from the image sensor;

in response to the raw image being obtained, display an image based on the raw obtained image on the display;

transmit the raw image to the first external electronic device via the communication circuit;

while displaying the image on the display, identify a plurality of subjects included in the image;

in response to the plurality of subjects being identified, output a plurality of first visual elements floated on multiple portions of the displayed image, the multiple portions corresponding to the plurality of identified subjects, respectively, wherein the multiple portions include a first portion of the image and a second portion of the image, and each of the first portion and the second portion of the image is less than an entirety of the image;

while outputting the plurality of first visual elements, identify information related to the plurality of subjects from the plurality of external servers corresponding to the plurality of subjects, respectively; and in response to the information related to the plurality of subjects being identified, output a plurality of second visual elements which are floated on the multiple portions and are based on identifiers of the plurality of external servers and at least part of the identified information, wherein the plurality of second visual elements are based on recognition information transmitted from plurality of external servers to the electronic device based on an identifier of the electronic device that the first external electronic device transmitted to the plurality of external servers, wherein the plurality of external servers include a first external server and a second external server, the recognition information includes a first recognition information and a second recognition information, the first recognition information is transmitted from the first external server to the electronic device based on the identifier of the electronic device that the first external electronic device transmitted to the first external server, and the second recognition information is transmitted from the second external server to the electronic device based on the identifier of the electronic device that the first external electronic device transmitted to the second external server.

16. The electronic device of claim 15, wherein, when being executed, the plurality of instructions further cause the at least one processor to output the plurality of second visual elements, based on at least one of positions of the multiple portions or positions of the plurality of first visual elements on the displayed image.

17. The electronic device of claim 15, wherein, when being executed, the plurality of instructions further cause the at least one processor to:
   In response to the raw image being obtained, transmit the obtained raw image to the first external electronic device;
   in response to the obtained raw image being transmitted, receive, from the first external electronic device, second information related to the plurality of subjects and the plurality of external servers corresponding to the plurality of subjects; and
   in response to the second information being received, output the plurality of first visual elements including shapes related to the plurality of external servers on the multiple portions.

18. The electronic device of claim 17, wherein, when being executed, the plurality of instructions further cause the at least one processor to output the plurality of first visual elements including outlines corresponding to shapes of the plurality of subjects on the multiple portions in response to the second information being received.

19. The electronic device of claim 15, wherein, when being executed, the plurality of instructions further cause the at least one processor to:
   identify a user input of selecting any one of the plurality of second visual elements outputted;
   in response to the user input selecting a second visual element being identified, identify an external server related to the selected second visual element from among the plurality of external servers; and
   in response to the external server related to the selected second visual element being identified, output a user interface corresponding to the identified external server to at least part of the display.

20. The electronic device of claim 19, wherein, when being executed, the plurality of instructions further cause the at least one processor to output the user interface based on an application using the identified external server, from among a plurality of applications installed in the memory.

* * * * *